US011009844B2

(12) United States Patent
Frangos

(10) Patent No.: US 11,009,844 B2
(45) Date of Patent: May 18, 2021

(54) METHOD AND APPARATUS OF DETERMINING A STATE OF A SYSTEM

(71) Applicant: SCHLUMBERGER TECHNOLOGY CORPORATION, Sugar Land, TX (US)

(72) Inventor: Michalis Frangos, Cambridge (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 418 days.

(21) Appl. No.: 15/749,227

(22) PCT Filed: Jul. 20, 2016

(86) PCT No.: PCT/US2016/043036
§ 371 (c)(1),
(2) Date: Jan. 31, 2018

(87) PCT Pub. No.: WO2017/023541
PCT Pub. Date: Feb. 9, 2017

(65) Prior Publication Data
US 2018/0210413 A1    Jul. 26, 2018

Related U.S. Application Data

(60) Provisional application No. 62/199,618, filed on Jul. 31, 2015.

(51) Int. Cl.
*G05B 19/042* (2006.01)
*G06F 17/18* (2006.01)
(Continued)

(52) U.S. Cl.
CPC .......... *G05B 19/0425* (2013.01); *E21B 21/08* (2013.01); *E21B 41/0092* (2013.01);
(Continued)

(58) Field of Classification Search
CPC .............. G01V 11/002; G05B 19/0425; G05B 13/027; G05B 17/02; G05B 23/024; G05B 17/00; G06F 17/18; G06N 7/005
See application file for complete search history.

(56) References Cited

U.S. PATENT DOCUMENTS 7,813,544 B2 * 10/2010 Fukaya .............. G06K 9/00248
382/118
9,727,671 B2 * 8/2017 Iyengar .................. G06F 30/20
(Continued)

FOREIGN PATENT DOCUMENTS

WO          0162603 A2    8/2001

OTHER PUBLICATIONS

Aanonsen, Sigurd I. et al., "The Ensemble Kalman Filter in Reservoir Engineering—A Review," SPE Journal, 14(3), 2009, pp. 393-412.
(Continued)

*Primary Examiner* — Elias Desta

(57) ABSTRACT

A method of determining a parameter and state of a system from a time series of a system measurement, comprising using a processor to: a) build an approximate model of the system; b) sample a plurality of approximate system parameters for a current time interval from a posterior probability distribution; c) determine an estimate of the system parameter at the current time interval from the distribution of the plurality of approximate system parameters; d) determine an estimate of the system state at the current time interval given the estimate of the system parameter; e) repeat b) to d) for the next time interval. An apparatus for performing the method is disclosed, and application of the method to drilling and wellbores is discussed.

20 Claims, 15 Drawing Sheets

(51) Int. Cl.
  E21B 21/08 (2006.01)
  G05B 13/02 (2006.01)
  E21B 44/00 (2006.01)
  G05B 17/02 (2006.01)
  G05B 23/02 (2006.01)
  E21B 41/00 (2006.01)
  G01V 11/00 (2006.01)
  G06N 7/00 (2006.01)
  G05B 17/00 (2006.01)

(52) U.S. Cl.
  CPC .......... *E21B 44/00* (2013.01); *E21B 44/005* (2013.01); *G01V 11/002* (2013.01); *G05B 13/027* (2013.01); *G05B 17/02* (2013.01); *G05B 23/024* (2013.01); *G06F 17/18* (2013.01); *G06N 7/005* (2013.01); *G05B 17/00* (2013.01)

(56) References Cited

U.S. PATENT DOCUMENTS

| | | | |
|---|---|---|---|
| 2004/0124009 A1 | 7/2004 | Hoteit et al. | |
| 2012/0310591 A1* | 12/2012 | Win | G01C 21/165 702/150 |
| 2014/0116776 A1 | 5/2014 | Marx et al. | |
| 2014/0156238 A1 | 6/2014 | Rashid et al. | |
| 2014/0278113 A1 | 9/2014 | Chok et al. | |
| 2015/0226049 A1 | 8/2015 | Frangos et al. | |
| 2015/0308204 A1 | 10/2015 | Johnson et al. | |

OTHER PUBLICATIONS

Andrieu, Christophe et al., "Particle Marcov Chain Monte Carlo Methods", Journal of the Royal Statistical Society—Series B: Statistical Methodology, 72(3), Jun. 2010, pp. 269-342.

Antoulas, Athanasios C. et al., "Approximation of Large-Scale Dynamical Systems," International Journal of Applied Mathematics and Computer Science, 11(5), 2001, pp. 1093-1121.

Doucet, Arnaud et al., "A Tutorial on Particle Filtering and Smoothing: Fifteen Years Later", Technical Report, Jun. 2012, pp. 1-41, accessed at https://web.archive.org/web/20120601130853if_http://www.stats.ox.ac.uk:80/~doucet/doucet_johansen_tutorialPF2011.pdf on Apr. 2, 2019.

Elsheikh, Ahmed H. et al., "Efficient Bayesian Inference of Subsurface Flow Models Using Nested Sampling and Sparse Polynomial Chaos Surrogates", Computer Methods in Applied Mechanics and Engineering, vol. 269, Feb. 2014, pp. 515-537.

Frangos, M. et al., "Surrogate and Reduced-Order Modeling: A Comparison of Approaches for Large-Scale Statistical Inverse Problems", 2001, John Wiley & Sons, Ltd., 27 pages.

Kamyab, M. et al., "Early Kick Detection Using Real Time Data Analysis with Dynamic Neural Network: A Case Study in Iranian Oil Fields", SPE136995, 34th Annual SPE International Conference and Exhibition, Tinapa—Calabar, Nigeria, Jul. 31-Aug. 7, 2010, 10 pages.

Kantas, Niloas et al., "On Particle Methods for Parameter Estimation in State-Space Models", Arxiv.org Preprints, Dec. 2014, pp. 1-31, accessed at https://arxiv.org/pdf/1412.8695v1.pdf on Apr. 9, 2019.

Metropolis, Nicholas, et al., "Equation of State Calculations by Fast Computing Machines", Journal of Chemical Physics, 21(6), Jun. 1953, pp. 1087-1092.

Rewienski, Michal Jerzy, "A Trajectory Piecewise-Linear Approach to Model Order Reduction of Nonlinear Dynamical Systems", PhD Thesis, Massachusetts Institute of Technology, 2003, 126 pages.

Rewienski, Michal Jerzy et al., "A Trajectory Piecewise-Linear Approach to Model Order Reduction and Fast Simulation of Nonlinear Circuits and Micromachined Devices", Computer-Aided Design of Integrated Circuits and Systems, 22(2), 2003, pp. 155-170.

International Preliminary Report on Patentability and Written Opinion in International Patent Application No. PCT/US2016/043036, dated Feb. 6, 2018, 13 pages.

Communication and Extended European Search Report in EP Patent Application No. 16833507.3, dated Apr. 16, 2019, 9 pages.

International Search Report and Written Opinion issued in International Patent Application No. PCT/US2016/043036 dated Oct. 27, 2016, 18 pages.

* cited by examiner

METHOD AND APPARATUS OF DETERMINING A STATE OF A SYSTEM

CROSS-REFERENCE TO RELATED APPLICATION

The present document is based on and claims priority to U.S. Provisional Application Ser. No. 62/199,618, filed Jul. 31, 2015, which is incorporated herein by reference in its entirety.

The present disclosure relates to a method and apparatus for Bayesian inference, or for determining a state of a system from measurements that may be subject to uncertainty.

BACKGROUND

In many cases, the state or parameters of a system may be difficult or impossible to directly measure or observe. For example, the state and/or parameters of a magma chamber of a volcano, or a geological fault, may be of interest in predicting the risk of an eruption or earthquake. Similarly, in some industries it can be difficult to determine a state or parameter of a system from the available measurement data. This may be because the measurements are subject to error, or because it is not possible or practicable to directly measure the system parameter(s) or state(s) of interest.

In such cases, it is known to use Bayesian inference to determine a probable state or parameter of the system, from a system measurement (or measurements), taking into account an understanding of the relationship between the measurement values and the system parameter(s) and state(s). Such an understanding may be in the form of a mathematical model.

A known technique for determining probable states and parameters of a system based on system measurements is particle filtering. However, a number of challenges limit the application of such techniques to real problems.

An improved method and apparatus for Bayesian inference is therefore desirable.

SUMMARY

According to a first aspect, there is provided a method of determining a parameter and state of a system from a time series of a system measurement. The method includes using a processor to perform at least one of the following: a) build an approximate model of the system; b) sample a plurality of system parameter values for a current time interval from an approximate posterior probability distribution that represents a probability distribution of the system parameter conditional on the system measurement for a current time interval and the approximate model; c) determine an estimate of the system parameter at the current time interval from the distribution of the plurality of sampled system parameter values; d) determine an estimate of the system state at the current time interval by simulating the evolution of an estimate of the system state for the previous time interval to the current time interval, given the estimate of the system parameter (e.g. for the current time interval); e) repeat b) to d) for the next time interval.

According to a second aspect, there is provided an apparatus which may comprise a processor.

The processor may include at least one of:
an input element for receiving a time series of a measurement of a system;
an output element for providing an estimate of a parameter of the system, or an estimate of a state of the system, for displaying on a display device.

The processor may be configured to provide, via the output element, an estimated system parameter or state by at least one of:
a) building an approximate model of the system for a current time interval;
b) using the approximate model and conditional on the system measurement for the current time interval, sampling a plurality of system parameter values for the current time interval from an approximate posterior probability distribution that represents the probability distribution of the system parameter conditional on the system measurement for the current time interval and based on the approximate model;
c) determining an estimate of the system parameter at the current time interval from the distribution of the plurality of sampled system parameter values;
d) determining an estimate of the system state at the current time interval by simulating the evolution of the estimate of the system state for the previous time interval to the current time interval, given the estimate of the system parameter for the current time interval;
e) repeating a) to d) for the next time interval.

The processor may be configured to perform the method of the first aspect, including any of the optional features thereof.

The apparatus may comprise a measurement while drilling system that includes the processor.

According to a third aspect, a machine readable medium is provided, comprising a set of instructions for configuring a processor to perform the method of the first aspect.

The machine readable medium referred to in any of the above aspects of the disclosure may be any of the following: a CDROM; a DVD ROM/RAM (including −R/−RW or +R/+RW); a hard drive; a memory (including a USB drive; an SD card; a compact flash card or the like); a transmitted signal (including an Internet download, ftp file transfer of the like); a wire; etc.

Features described in relation to any of the above aspects of the disclosure may be applied, mutatis mutandis, to any of the other aspects of the disclosure.

BRIEF DESCRIPTION OF THE DRAWINGS

One or more embodiments will now be described, by way of example only, with reference to the accompanying drawings in which.

DETAILED DESCRIPTION OF THE DRAWINGS

Figure 1:
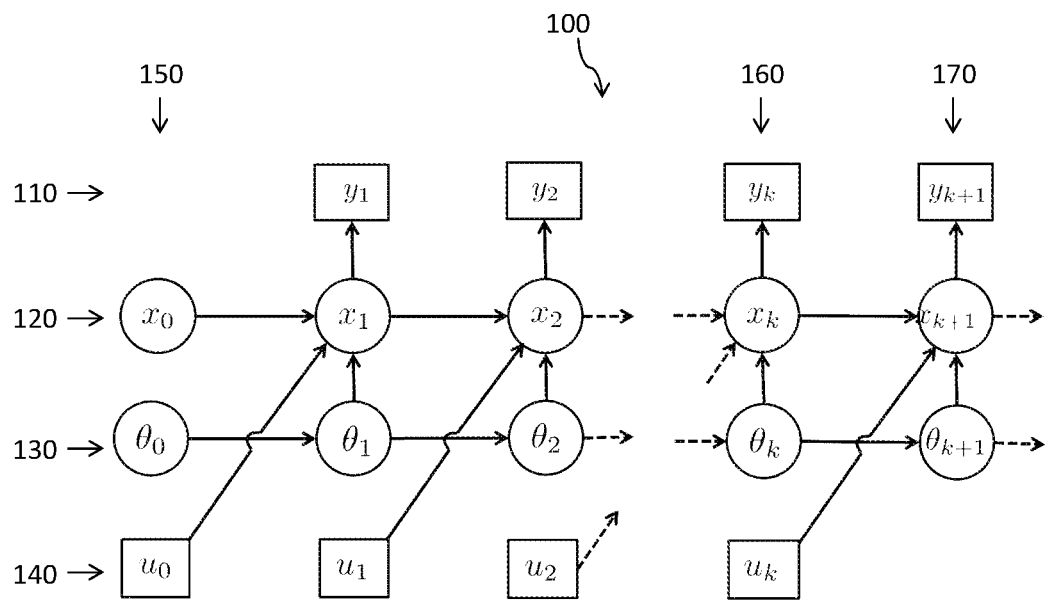
FIG. 1 is a diagram of a Markov sequence, in which circles represent hidden variables, and squares represent known and observed variables.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The present disclosure is of particular relevance to the oil and gas industry although will also find utility in other industries. As such, it is convenient to describe an embodiment with reference to the oil and gas industry where there is a desire to eliminate potentially catastrophic future events similar to the Deepwater Horizon disaster. This event arose due to a failure to detect a gas kick from the wellbore.

Detecting a gas kick is challenging, because it may involve inferring the state of the wellbore from measurements that are uncertain or subject to error. To learn the "hidden" state of the distribution of gas along the wellbore from partial, inaccurate and indirect observations, involves having an understanding of the underlying process in terms of a physical model. The dynamic process of gas distribution and transport along the wellbore can be captured by models, based on computational fluid dynamics. These models may relate system states and parameters such as: gas distribution; pressure and velocity profiles along the wellbore; pump flow; friction; slip velocity of gas; and other process parameters. The model may describe the evolution of these parameters and states with time. Some of the model parameters may be unknown or uncertain and, when varied, may cause a change in the response of the state of the process or system. The changes in system response may be observed by measurements obtained via sensors. The problem of learning the "hidden" state of the system given physical models and potentially uncertain measurements may be considered as a statistical inversion problem, more specifically a Bayesian inference problem.

Data assimilation is the process by which observations are incorporated into a computer model of a real system. Applications of data assimilation arise in many fields of geosciences, perhaps most importantly in weather forecasting and hydrology. Data assimilation proceeds by analysis cycles. In each analysis cycle, observations of the current (and possibly past) state of a system are combined with the results from a numerical model (the forecast) to produce an analysis, which is considered as 'the best' estimate of the current state of the system. This is called the analysis step. Essentially, the analysis step tries to balance the uncertainty in the data and in the forecast. The model is then advanced in time and its result becomes the forecast in the next analysis cycle. In data assimilation applications, the analysis and forecasts are best thought of as probability distributions. The analysis step is an application of Bayes' theorem and the overall assimilation procedure is an example of recursive Bayesian estimation or Bayesian inference.

In this disclosure, we demonstrate an efficient method based on Bayesian inference for data assimilation to estimate gas-distribution, pressure profiles along the wellbore, the input rate of gas mass from the open hole, and gas-slip velocity. Pressure in the wellbore is constantly monitored using pressure sensors located at the surface, and/or at the bottom of the drill-string, and sometimes also distributed along the drill-string. In-flow and/or out-flow rates of the drilling mud are constantly monitored at the surface. A suitable multiphase flow model e.g. a finite element model is incorporated into the Bayesian framework. Pressure measurements and flow rate measurements of the current state are compared using a likelihood function and a prior with predictions from the multiphase flow model to produce an analysis and an estimation of the current state of the system is then inferred, the current state comprising gas-distribution, pressure profiles along the wellbore, the input rate of gas mass from the open hole, and gas-slip velocity of the system.

The current state estimates are fed directly to a control unit. Alternatively, the current state estimates are used to calculate further properties such as the total volume of gas in the wellbore, and the further properties may be fed to a control unit. Optionally, the current state estimates and the further properties may both be fed to a control unit.

The control unit in turn controls the pressure profile of the wellbore for example by adjusting a surface choke for managed pressure drilling.

The method described above is used online or in real-time to estimate gas-distribution, pressure profiles along the wellbore, the input rate of gas mass from the open hole, and gas-slip velocity of the system. Equally, the method can be used to estimate other hidden or partially observable process parameters of interest, for example temperature profile, friction factors, cuttings profiles, formation fractures location, fracture volume, reservoir properties, wellbore shape and/or other wellbore properties, provided suitable models and sensor measurements are available. Useful sensor measurements include flow out measurements, calliper measurements, fluid properties or other logging-while-drilling measurements, and measurements-while-drilling measurements.

Similarly, these other estimations can be used for monitoring and decision making, or fed into a control system to control the drilling process.

The application of known Bayesian inference modelling to some problems may be difficult for a number of reasons.

Models may be non-linear and require some time to converge to a numerical solution. Any perturbations on the states that are not consistent with physics may lead to spurious results during the simulations and the models might not even converge. This limitation is a problem for statistical inversion, as it implies that any inversion technique involving state correction or perturbation (e.g. ensemble Kalman filtering) cannot be used. Particle filtering approaches do not involve state correction or perturbation, but involve a large number of forward model simulations, which may be prohibitively computational expensive, particularly if real-time, or near-real time system state estimation is desired. Furthermore, forward model simulations of complex processes, such as multi-phase flow, are computationally demanding, which significantly limits the speed with which system states may be estimated. Real-time (or near real-time, e.g. at a slow-down factor of 2 or less) estimation of system states by model inversion may be ruled out by the number and complexity of forward simulations necessary to achieve this in prior art techniques.

Although numerical models are based on physics, in some industries (such as the oil & gas industry), models may only be made available to users in the form of black box packages, which are primary accessible through numerical simulations. The set of equations describing the underlying physics are not always available, and this can be a limiting factor in utilizing standard model reduction and approximation techniques.

Bayesian filtering for time-varying processes is considered to be a statistical inversion problem, where the unknown quantities of interest, state and uncertain parameters, may be vector valued time series $x_{0:k}$ $\{x_0, \ldots, x_k\}$ and $\theta_{0:k}$ $\{\theta_0, \ldots, \theta_k\}$, which are observed indirectly through noisy measurements $y_{1:k}$ $\{y_1, \ldots, y_k\}$ given a series of inputs $u_{0:k}$ $\{u_0, \ldots, u_k\}$. Following a Bayesian approach the solution to the inverse problem is the full joint posterior distribution of the states $x_{0:k}$ and parameters $\theta_{0:k}$ given the observations $y_{1:k}$ and inputs $u_{0:k}$, $$p(x_{0:k}, \theta_{0:k} | y_{1:k}, u_{0:k}) \tag{1}$$

However, the dynamic estimation of the full joint distribution above is computationally intractable, as the dimensionality of the full posterior increases with the evolution of time. To achieve tractable solutions to the inverse problem, the following two approaches may be used: i) relaxing the inverse problem by estimating the selected marginal distributions of the current state and uncertain parameters given the current and previous measurements $y_{1:k}$; and ii) restricting the class of dynamic models to probabilistic Markov sequences. This disclosure considers probabilistic models of the form of a hidden Markov chain as shown in FIG. 1.

In FIG. 1, a Markov sequence or chain (100) is shown, in which circles represent hidden variables, and squares represent known or observed variables. Rows 110, 120, 130, 140 are respectively outputs y, states x, parameters θ, and inputs u. The columns each represent time intervals, starting from $t=t_0$ at 150 to the current time $t=t_{k+10}$ at 170, via the previous time interval $t=t_k$ at 160.

Generally a probabilistic model is a hidden Markov chain if it comprises:
a probability density $p(x_0, \theta_0)$ to describe an initial belief in relation to the hidden states and uncertain parameters;
an evolution model describing the system dynamics as a Markov sequence, which is defined in terms of a transition kernel $p(x_{k+1}, \theta_{k+1} | x_k, \theta_k, u_k)$ given previous states x, parameters θ and inputs u;

an observation model describing the dependency of measurements y on current states x by the likelihood $p(y_k | x_k)$.

Under the conditions above, the filtering problem is simplified by estimating the marginal probability distribution $$p(x_{k+1}, \theta_{k+1} | y_{1:k+1}, u_{0:k+1}) = \frac{p(y_{k+1} | x_{k+1}) p(x_{k+1}, \theta_{k+1} | y_{1:k}, u_{0:k})}{p(y_{k+1} | y_{1:k}, u_{0:k})} \quad (2)$$

for $k = 0 \ldots, T$.

In the joint posterior distribution above, the prediction probability density is given by, $$p(x_{k+1}, \theta_{k+1} | y_{1:k}, u_{0:k}) = \iint p(x_{k+1}, \theta_{k+1} | x_k, \theta_k, u_k) p(x_k, \theta_k | y_{1:k}, u_{0:k}) dx_k d\theta_k \quad (3)$$

and where $p(y_{k+1} | y_{1:k}, u_{0:k})$ is a normalizing factor which is constant with respect to the states $x_{k+1}$ and inputs $u_{k+1}$.

Process Model

Figure 2:
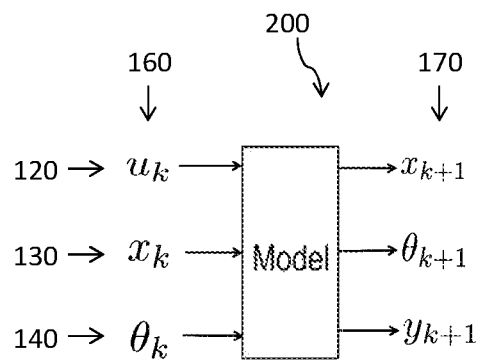
FIG. 2 is a schematic diagram of a model of a system.

This disclosure may deal with models that are primarily accessible through numerical simulations, and is often the case that these models are available to users as gray or black boxes. The diagram in FIG. 2 illustrates a suitable form of a dynamic model, governed by the following set of equations, $$y_k | x_k, e_k^y = G_y(x_k, e_k^y) = G_y(x_k) + e_k^y \sim p(y_k | x_k, e_k^y) \quad (4)$$

$$\theta_{k+1} | \theta_k, e_k^\theta = G_\theta(\theta_k, \theta_k^\theta) = \theta_k + e_k^\theta \sim p(\theta_{k+1} | \theta_k, e_k^\theta) \quad (5)$$

$$x_{k+1} | x_k, \theta_k, u_k = G_x(x_k, \theta_k, u_k) \sim p(x_{k+1} | x_k, \theta_k, u_k) \quad (6)$$

where $e_k^y \sim p_{e^y}(\ )$ is the noise on sensor measurements $y_k$ and where the uncertain process parameters can be external inputs to the system (e.g., gas kick rate) or internal model parameters (e.g., slip velocity of gas). The equations above satisfy the Markov properties and describe the evolution of the states and outputs of the physical process they represent. As the uncertain parameters are time-varying, their evolution can be considered in time as a random walk with noise $e_k^\theta \sim p_{e^\theta}(\ )$, while this does not restrict the search of non-stationary uncertain parameters. In addition, the uncertain parameters are under lower and upper bounds constraints $\underline{\theta} \leq \theta_{k+1} \leq \overline{\theta}$, and a shrinkage prior $p_\theta(\theta_k)$ to restrict the search of the uncertain parameter within their prior, such that $$\theta_{k+1} | \theta_k, e_k^\theta \sim p(\theta_{k+1} | \theta_k, e_k^\theta) \propto p_\theta(\theta_{k+1}) \delta(\underline{\theta} \leq \theta_{k+1} \leq \overline{\theta}) \delta(\theta_{k+1} G_\theta(\theta_k, e_k^\theta)) \quad (7)$$

FIG. 2 illustrates an example process model 200. The model 200 comprises inputs $u_t$, $x_t$ and $\theta_t$ (respectively indicated by 120, 130, 140) at the previous time interval $t=t_k$; and outputs $x_{t+1}$, $\theta_{k+1}$, and $y_{t+1}$ at the current time interval $t=t_{k+1}$.

Note that in (5) there is no direct perturbation/noise on the states variable $x_k$. In this disclosure the system model may be highly nonlinear and any perturbations on the states that are not consistent with physics may lead to spurious results and convergence issues with the numerical techniques for solving $G_x(\ )$ uncertainty is propagated through the uncertainty of previous states, inputs and parameters.

The states, inputs, parameters and outputs of the multi-phase flow benchmark model considered here are a concatenation of all relevant model variables in vectors x, u, θ and y respectively (ignoring time indexing k). These are summarized in Table 1 below.

TABLE 1

Notation

| | States | | |
|---|---|---|---|
| x | u_profile | [m/sec] | gas-fluid mixture velocity |
| | m_g_profile | [Kg] | gas mass profile |
| | m_l_profile | [Kg] | fluid mass profile |
| | Inputs | | |
| u | m_dot_inlet_in | [kg/sec] | pump in-flow |
| | choke_frac_in | ϵ[0, 1] | choke opening fraction |
| | Parameters (certain and uncertain) | | |
| θ | u_slip | [m/sec] | gas slip velocity |
| | m_dot_gaskick_in | [Kg/sec] | gas kick rate |
| | other | | other known variables |
| | Outputs (observed and unobserved) | | |
| y | mgf_profile_out | [no units] | gas mass/overall mass ratio |
| | PT_sensors_obs | [PA] | pressure observations |

A number of geometry parameters and other model parameters have been lumped together as 'other' variables for clarity of presentation. In the rest of this disclosure, variables θ and y refer only to the uncertain parameters and observed outputs respectively.

In the discussion above the model equations and the basic elements of an approach to Bayesian inference modelling have been defined. A particle filtering approach, for model inversion of general nonlinear models to observe a dynamic process given some noisy measurements and a model describing the process, is now described.

Particle Filtering

In particle filtering the posterior and predictive distributions, (2) and (3) respectively, are approximated by an ensemble of N samples (particles), $$\{x_k^{(j)}, \theta_k^{(j)}\}_{j=1}^N.$$

Figure 3:
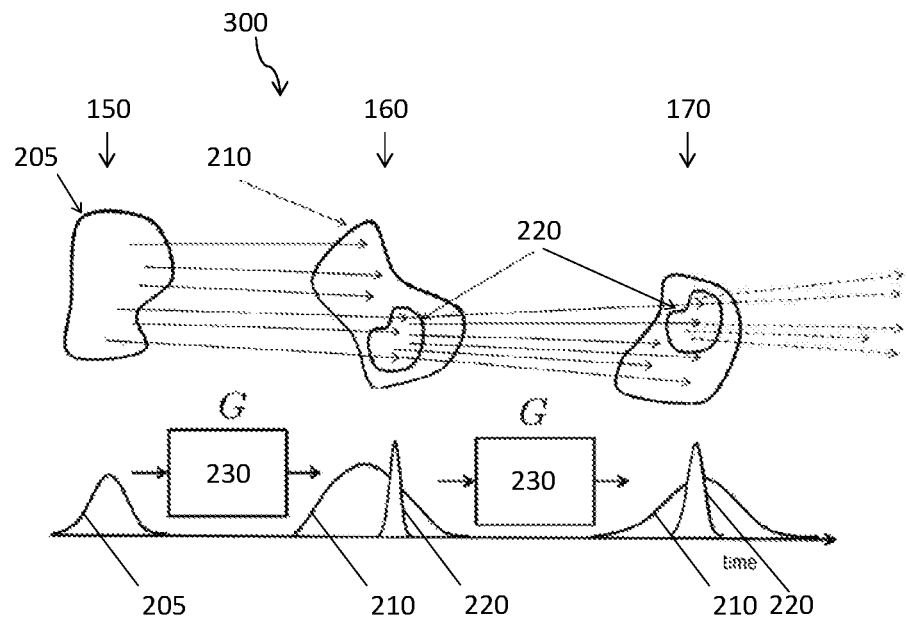
FIG. 3 is a diagram of a particle filtering process of Bayesian inference.

In particular, the particles are propagated via forward model simulations to obtain their prediction in time. Once recent data are available the particles are updated by drawing samples from the posterior distribution. This is illustrated in FIG. 3, which shows an overview of a particle filtering process 300. At an initial time $t=t_0$ (indicated by 150), a parameter space and state 205 is defined. Samples (or particles) from the parameter/state space 205 are propagated forward in time to a subsequent time 160, by forward model simulations 230, using a physical model G to obtain a prediction in time. Once recent data are available (i.e. at time interval 160 or subsequent time interval 170), the distribution of predicted states and parameters 210 (i.e. particles) are updated by drawing samples from the posterior distribution (i.e. the probability distribution of the particles conditional on the recent data), to produce a distribution of parameters and states 220 that are consistent with the data. New particles can be sampled from this distribution 220, and forward propagated by simulation to the next time interval 170. The theoretical background for this method is described below:

Considering the model equations and variables defined in (4) to (7), if $$\theta_k, x_k \sim p(x_k, \theta_k | \theta_k | y_{1:k}, u_{0:k}) e_k^\theta \sim p_{e^\theta}(e_k^\theta) \quad (8)$$

then the posterior distribution in (2) can be approximated as, $$p(x_{k+1}, \theta_{k+1} | y_{1:k+1}, u_{0:k+1}) \approx \Sigma_{j=1}^N w_j \delta(\theta_{k+1}^{(j)} G_\theta (\theta_k^{(j)}, e_k^{\theta(j)})) \delta(x_{k+1}^{(j)} G_x(x_k^{(j)}, \theta_{k+1}^{(j)}, u_k)) \quad (9)$$

where the weights $w^{(j)}$ are given by, $$w^{(j)} = \tilde{w}^{(j)} / \Sigma_{i=1}^{N} \tilde{w}^{(i)} \quad (10)$$

$$\tilde{w}^{(j)} = p_{e^y}(y_{k+1} G_y(x_{k+1}^{(j)})) p_\theta(\theta_{k+1}^{(j)}) \delta(\underline{\theta} \leq \theta_{k+1}^{(j)} \leq \overline{\theta}) \quad (11)$$

A proof of these approximations and an algorithm for particle filtering, based on importance re-sampling, is given below. Combining the equations (2) and (3) gives, $$p(x_{k+1}, \theta_{k+1} | y_{1:k+1}, u_{0:k+1}) \propto \iint p(y_{k+1} | x_{k+1}) p(x_{k+1}, \theta_{k+1} | x_k, \theta_k, u_k) \times p(x_k, \theta_k | y_{1:k}, u_{0:k}) dx_k d\theta_k \quad (12)$$

From the independence properties described in the hidden Markov diagram in FIG. 1, $$p(x_{k+1}, \theta_{k+1} | x_k, \theta_k, u_k) = p(x_{k+1} | x_k, \theta_{k+1}, u_k) p(\theta_{k+1} | \theta_k) \quad (13)$$

where, considering the model definition in (6), $$p(x_{k+1} | x_k, \theta_k, u_k) = \delta(x_{k+1} G_x(x_k, \theta_{k+1}, u_k)), \quad (14)$$

and considering the model definition in (4)

$$p(y_{k+1} | x_{k+1}) = \int p(y_{k+1} | x_{k+1}, e_{k+1}^y) p_{e^y}(e_{k+1}^y) de_k^y = \int \delta(y_{k+1} G_y(x_{k+1}) + e_{k+1}^y) p_{e^y}(e_{k+1}^y) de_k^y = p_{e^y}(y_{k+1} G_y(x_{k+1})) \quad (15)$$

Similarly, from the model definition in (7)

$$p(\theta_{k+1} | \theta_k) = \int p(\theta_{k+1} | \theta_k, e_k^\theta) p_{e^\theta}(e_k^\theta) de_k^\theta \propto \int p_\theta(\theta_{k+1}) \delta(\underline{\theta} \leq \theta_{k+1} \leq \overline{\theta}) \delta(\theta_{k+1} G_\theta(\theta_k, \theta_k^\theta)) p_{e^\theta}(e_k^\theta) de_k^\theta \quad (16)$$

Substituting (13) to (16) in (12), results in:

$$p(x_{k+1}, \theta_{k+1} | y_{1:k+1}, u_{0:k+1}) \propto \iiint p_{e^y}(y_{k+1} G_y(x_{k+1})) p_\theta(\theta_{k+1}) \delta(\overline{\theta} \leq \theta_{k+1}^{(j)} \leq \overline{\theta}) \times \delta(x_{k+1} G_x(x_k, \theta_{k+1}, u_k)) \delta(\theta_{k+1} G_\theta(\theta_k, e_k^\theta)) \times p_{e^\theta}(e_k^\theta) p(x_k, \theta_k | y_{1:k}, u_{0:k}) de_k^\theta dx_k d\theta_k \quad (17)$$

The result follows from Monte Carlo integration of (29), by considering samples $e_k^y$, $\theta_k$, and $x_k$ from, $$\theta_k, x_k \sim p(x_k, \theta_k | y_{1:k}, u_{0:k}), e_k^\theta \sim p_{e^\theta}(e_k^\theta) \quad (18)$$

Below, is provided an example algorithm for particle filtering, where the updated particles are obtained by importance resampling.

Particle Filtering Algorithm

1) The noise variables can be assumed (for example) to be mixtures of M Gaussian distributions, with given weights $\phi^{(m)}$, means $\mu^{(m)}$ and variance $\Gamma^{(m)}$ for $m=1, \ldots, M$, and the shrinkage prior of the uncertain parameters is a zero mean Gaussian distribution with covariance $\Gamma_\theta$, $$e_k^\theta \sim p_{e^\theta}(e_k^\theta) = \sum_{m=1}^{M} \phi_{e^\theta}^{(m)} \mathcal{N}(\mu_{e^\theta}^{(m)}, \Gamma_{e^\theta}^{(m)})$$

$$e_k^y \sim p_{e^y}(e_k^y) = \sum_{m=1}^{M} \phi_{e^y}^{(m)} \mathcal{N}(\mu_{e^y}^{(m)}, \Gamma_{e^y}^{(m)})$$

$$\theta \sim p_\theta(\theta) = \mathcal{N}(0, \Gamma_\theta)$$

2) At time $t_k$ given inputs $u_k$ and an ensemble of N particles $\{x_k^{(j)}, \theta_k^{(j)}\}_{j=1}^{N}$ evolve the particles in time by simulating the model equations forward in time, $$\{\theta_{k+1}^{(j)}\}_{j=1}^{N}; \theta_{k+1}^{(j)} = G_\theta(\theta_k^{(j)}, e_k^{\theta(j)})$$

$$\{x_{k+1}^{(j)}\}_{j=1}^{N}; x_{k+1}^{(j)} = G_x(x_k^{(j)}, \theta_{k+1}^{\theta(j)}, u_k)$$

$$\{y_{k+1}^{(j)}\}_{j=1}^{N}; y_{k+1}^{(j)} = G_y(x_{k+1}^{(j)})$$

3) At time $t_{k+1}$ if new data $y_{k+1}$ are available, update the particles by resampling:

a) Compare particles weights $\{w^{(j)}\}_{j=1}^{N}$ $$\tilde{w}_{k+1}^{(j)} = p_{e^y}(y_{k+1} y_{k+1}^{(j)}) p_\theta(\theta_{k+1}^{(j)}) \delta(\underline{\theta} \leq \theta_{k+1}^{(j)} \leq \overline{\theta})$$

$$w^{(j)} = \tilde{w}^{(j)} / \sum_{i=1}^{N} \tilde{w}^{(i)}$$

b) Perform resampling according to particles' weights $$\{x_k^{(j)}, \theta_k^{(j)}\}_{j=1}^{N} = x_{k+1}^{J}, \text{ s.t. } \sum_{i=1}^{l-1} w_{k+1}^{(i)} < c^{(j)} \leq \sum_{i=1}^{l-1} w_{k+1}^{(i)}$$

where $c^{(j)} \in \mathcal{U}([0,1])$

4) Update the particles, $$\{x_{k+1}^{(j)}, \theta_{k+1}^{(j)}\}_{j=1}^{N} = \{\tilde{x}_{k+1}^{(j)}, \tilde{\theta}_{k+1}^{(j)}\}_{j=1}^{N}$$

and go to 2)

Note, the bounds may be kept as particles.

Improved Model Inversion

To address the challenges identified with existing model inversion methods, a new method is provided. The method may include features selected from the following:

Sample directly from the posterior (e.g. using Single Component Metropolis Hastings);

Use model approximation for accelerating forward simulations;

Use a forward simulation of a previous maximum a posteriori (MAP) estimation of a system state to update the system state (rather than using a MAP estimation from the approximate posterior distribution); and/or Generate future state predictions originating only from the MAP scenario.

Figure 4:
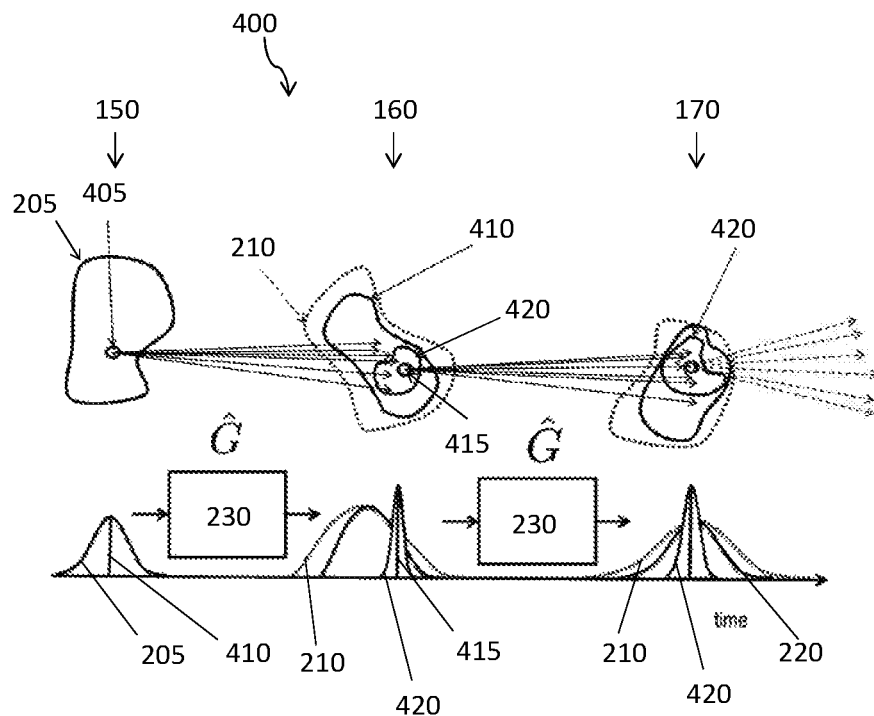
FIG. 4 is a diagram of a Bayesian inference method according to an embodiment.

A summary of the method provided by the embodiment being described is shown in FIG. 4. The method 400 is illustrated with reference to an initial time 150 (corresponding with $t=t_0$), and two further time intervals 160, 170 (respectively corresponding with $t=t_k$ and $t=t_{k+1}$ respectively). A most likely state x and parameter θ, 405 are selected from within the initial distribution 205 of possible states and parameters. Once measurement data $y_k$ are available (at 160), a sample is taken directly from the posterior distribution 420, using an approximate model $\hat{G}$, 230. An efficient sampling technique is preferably used, such as Single Component Metropolis Hastings (although other sampling techniques may also be used, such as Gibbs sampling, slice sampling, multiple-try Metropolis sampling and reversible jump sampling).

The sample is selected from a subspace 410 of the full posterior distribution, because only states that are reachable from the preceding MAP state $x_{MAP}$, 405, are sampled. This is in contrast to the more conventional particle filtering approach described above (see FIG. 3). Conditioning the subspace 410 on the data $y_k$ further reduces the state and parameter space to those consistent with the data 420.

The use of an approximation $\hat{G}$ instead of the full forward model G, enables faster computation. As is demonstrated herein, searching a subspace of all possible state predictions using reduced order approximations of the full forward model is adequate for state and parameter estimation with significant computational savings (from many hours to a few minutes). The trade-off is that the estimations produced by the model are approximate. However, the full forward approximations (using model G) are themselves usually only an approximation of reality. Therefore, even an approximate estimation of the dominant behaviour of a complex process (e.g. drilling) may provide significant insight into the process, enabling at least one of process control, optimisation and decision making.

An example method is described below, using Single Component Metropolis Hastings (SCMH) sampling and piecewise model approximation techniques. The combination is synergistic, because the piecewise model approximations can be readily tailored for the SCMH sampling technique.

Single Component Metropolis Hastings Sampling

A computationally efficient approach to sample from a distribution of a high dimensional parameter $\theta_k = [\theta_{k,1}, \ldots, \theta_{k,n}]^T \in \mathbb{R}^n$ at time $t_k$, is to update the components one by one by the single-component Metropolis-Hastings approach, which is the framework for Markov Chain Monte Carlo analysis originally proposed by Metropolis et al. To proceed with a description of the approach, the following notation is used $\theta_{k,-i} = [\theta_{k,1}, \ldots, \theta_{k,i-1}, \theta_{k,i+1}, \ldots, \theta_{k,n}]^T$ to denote all elements of $\theta_k$ except $\theta_{k,i}$. The approach is iterative, and at the end of the $j^{th}$ iteration, a sample $\theta_k^{(j)}$ is generated from the posterior distribution. An iteration j of the SCMH algorithm, consists of n steps, where n is the length of the uncertain parameter vector $\theta_k$, and this is described in the following. A candidate $\tilde{\theta}_{k,i}^{(j)}$ for the $i_{th}$ component of $\theta_k^{(j)}$ is generated from a proposal distribution q(|). Then, a sample from the posterior of the uncertain parameter is accepted with probability (19)

$$\alpha = \min\left(1, \frac{p(\tilde{\theta}_{k,i}^{(j)} \mid \theta_{k,-i}^{(j)}, y_{1:k}, u_{0:k}) q(\theta_{k,i}^{(j)} \mid \tilde{\theta}_{k,i}^{(j)}, \theta_{k,-i}^{(j)})}{p(\theta_{k,i}^{(j)} \mid \theta_{k,-i}^{(j)}, y_{1:k}, u_{0:k}) q(\tilde{\theta}_{k,i}^{(j)} \mid \theta_{k,i}^{(j)}, \theta_{k,-i}^{(j)})}\right) \quad (19)$$

where (in this work) a symmetric proposal distribution is chosen q(|) (i.e., it is assumed it is equally probable to move from the candidate proposal to the current value, and the other-way around, hence there is a cancellation of the ratio of the proposal distributions), and $p(\tilde{\theta}_{k,i}^{(j)} \mid \theta_{k,-i}^{(j)}, y_{1:k}, u_{0:k})$ is the full conditional distribution for $\theta_{k,i}^{(j)}$. Due to the simplicity in using a symmetric distribution, the proposal distribution near the boundaries is assumed to be symmetrical. The drawback is a higher rejection rate of proposed moves near the boundary; however this does not affect the practicality or predictive power of the method.

The full conditional distribution is defined as the distribution of parameter $\theta_{k,i}^{(j)}$ given all other parameters and data, and has a distribution, $$p(\tilde{\theta}_{k,i}^{(j)} \mid \theta_{k,-i}^{(j)}, y_{1:k}, u_{0:k}) = \frac{p(\tilde{\theta}_{k,i}^{(j)}, \theta_{k,-i}^{(j)}, x_k \mid y_{1:k}, u_{0:k})}{\int p(\tilde{\theta}_{k,i}^{(j)}, \theta_{k,-i}^{(j)}, x_k \mid y_{1:k}, u_{0:k}) d\theta_{k,-i} dx_k} \propto \quad (20)$$

$$p_{e^y}(y_k G_y(x_k^{(j)})) p_\theta(\tilde{\theta}_k^{(j)}) \delta(\underline{\theta} \leq \tilde{\theta}_k^{(j)} \leq \overline{\theta})$$

where in (20), at step i, $\tilde{\theta}_{k,-i}^{(j)} = \theta_{k,-1}^{(j)}$ and $\tilde{\theta}_{k,i}^{(j)}$ is the search parameter. A complete iteration j results in the jth sample $\theta_k^{(j)}$ from the posterior, which is obtained once there is a sample in all directions of the uncertain parameter. A generation of a number of samples by SCMH for a two-dimensional parameter is graphically illustrated in FIG. 5.

Figure 5:
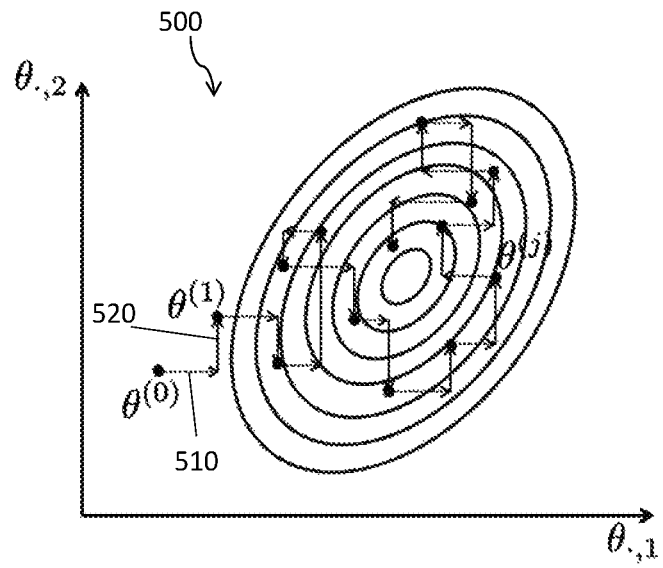
FIG. 5 is a diagram illustrating a random walk parameter sampling method.

FIG. 5 shows a graph 500, with a first axis and second axis, respectively corresponding with parameters $\theta_{,1}$ and $\theta_{,2}$. The SCMH sampling procedure from $\theta^{(0)}$ to $\theta^{(j)}$ is illustrated, which proceeds in a series of successive random steps (510, 520) parallel with the respective axes. The probability of the steps being accepted is larger if the parameter sample after the step is more probably consistent with the observed data (based on the simplified model). Over time, this results in a greater density of sampling of parameters that are more probably consistent with the observed data.

Model Approximation Tailored for SCMH Sampling

When sampling from the posterior, whether this is via particle filtering or via the SCMH approach, a large number of forward model simulations are required. The forward model simulations enter the SCMH framework through (20), via models $G_y( )$ and $G_x( )$ since from the definitions (4) to (7), $$G_y(x_{k+1}) = G_y(G_x(x_k, \theta_{k+1}, u_k)) \quad (21)$$

The use of computationally complex forward models may be prohibitive for real-time model inversion (particularly for models comprising multi-phase fluid dynamics).

Therefore, surrogate models may be used to accelerate the sampling process. One approach would be to develop offline approximations using suitable approximation methods (a number of approximation techniques of dynamic systems can be seen for example in *A. C. Antoulas. Approximation of large-scale dynamical systems, volume 6. Society for Industrial Mathematics, 2005* and references therein). However, this can be a rather challenging task. For example, in relation to the case of drilling, decisions regarding the geometry may change depending on the challenges appearing while drilling, whether these are environmental, operational or from a human factor. To accommodate such changes in a flexible way, surrogate (or approximate) models may be developed from approximations in real-time (or may be updated periodically during a process of parameter estimation from a time series of measurements). However, the development of such approximations may require full forward model simulations. To enable efficient computation of surrogate models, requiring a minimum number of full forward model simulations, model approximations tailored specifically for the SCMH sampling have been developed, as described below.

In the SCMH sampling approach described above, the underlying parameter Ok is sampled element by element while considering everything else as known. Thus, embodiments exploit this property of SCMH, and develop accurate model approximations $G^i(\theta_{k,i})$ in the directions of $\theta_{k,i}$ considering all other variables constant.

Such approximations do not cover the whole space of the underlying parameters and states, but are instead accurate in the directions of interest. This considerably reduces the computational complexity in determining the approximate models, and is synergistic with the SCMH sampling methodology.

If, at time $t_k$, we define the exact forward model solution from the most likely state $x_{k-1}^{MAP}$ parameters $\theta_k = \theta_{k-1}^{MAP}$ and input $u_{k-1}$, as $$G^0 = G(x_{k-1}, \theta_k, u_{k-1})|_{x_{k-1} = x_{k-1}^{MAP}, \theta_k = \theta_{k-1}^{MAP}, u_{k-1}} \quad (22)$$

then the overall model approximation $\hat{G}(\theta_k)$ as a function of $\theta_k$ only, is a superposition of $G^0$ and the deviations of each individual models $G^i(\theta_{k,i})$ from $G^0$, $$\hat{G}(\theta_k) = G^0 + \sum_{i=1}^{n} G^i(\theta_{k,i}) = G^0 + \sum_{i=1}^{n} (G^i(\theta_{k,i}) G^0) \quad (23)$$

Figure 6:
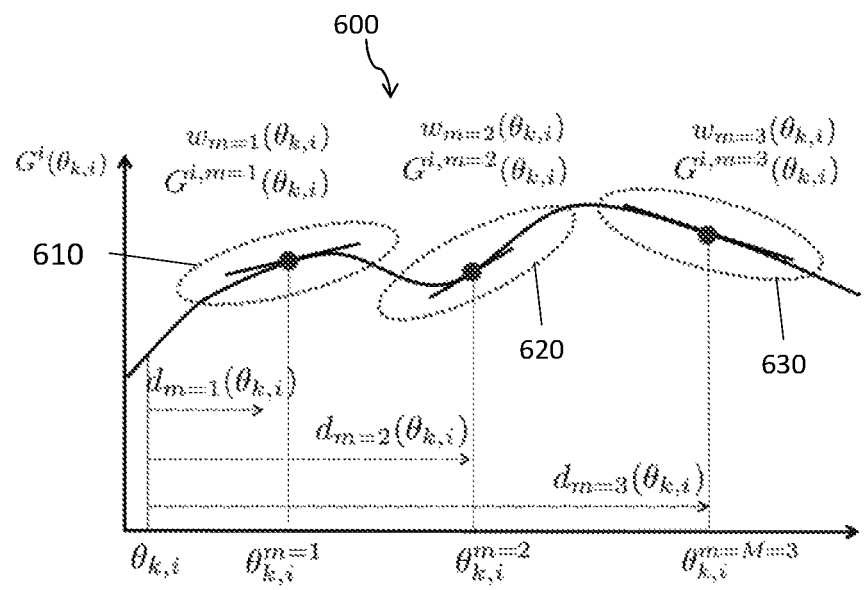
FIG. 6 is a graph illustrating a piecewise model approximation approach.

To describe the approximation approach for each individual model $G^i(\theta_{k,i})$ FIG. 6 may be used as a visual aid. In FIG. 6 the model approximation 600, $G^i(\theta_{k,i})$, (approximation of $G(\theta)$ in the direction of $\theta_{k,i}$) is a mixture of Taylor series expansions $G^{i,m}(\theta_{k,i})$ around multiple (three) interpolation points $\theta_{k,i}^m$ (denoted by 610, 620 and 630 for m=1,2 and 3.

The goal is to approximate $G(\theta_{k,i})$ in the direction of $\theta_{k,i}$ while all other variables are constant. As the response of the function G with respect to $\theta_{k,i}$ is generally non-linear, following a trajectory piecewise-linear approach, a non-linearity is introduced by considering a mixture of models $G^{i,m}(\theta_{k,i})$, $$G^i(\theta_{k,i}) = \sum_{m=1}^{M} w_m(\theta_{k,i}) G^{i,m}(\theta_{k,i}) \quad (24)$$

where each model $G^i,m(\theta_{k,i})$ with weight $E_{m=1}^M w_m(\theta_{k,i})$ is a Taylor approximation of the full model around selection interpolation points $\theta_{k,i}^m$ (with higher order terms denoted by. o.t.), $$G^{i,m}(\theta_{k,i}) = G(\theta_{k,i}^m) + G(\theta_{k,i}^m)'(\theta_{k,i}\theta_{k,i}^m) + .o.t. \quad (25)$$

To ensure that the dominant behaviour of the model at an arbitrary point $\theta_{k,i}$ corresponds to the model around the interpolation point closer to it, the weights can be constructed as functions of their distance $d_m(\theta_{k,i})$ from the interpolation points, $$d_m(\theta_{k,i}) = \|\theta_{k,i}\theta_{k,i}^m\|_2 \quad (26)$$

A suitable weight function is, $$\overline{w}_m(\theta_{k,i}) = \left[\exp\left(\frac{d_m(\theta_{k,i})}{\min[d_1(\theta_{k,i}), \ldots, d_M(\theta_{k,i})]}\right)\right]^{-25}, \quad (27)$$

$$w_m(\theta_{k,i}) = \frac{\overline{w}_m(\theta_{k,i})}{\sum_{j=1}^{M} \overline{w}_j(\theta_{k,i})} \quad (28)$$

A question arising in the area of model approximation by moment matching (such Pade approximations, Krylov subspace approximation techniques, etc), is the selection of the interpolation points. In this disclosure the uncertain parameter $\theta_k$ is to be estimated, given all available measured data. Therefore, if at time $t_k$ the MAP estimate of the uncertain parameter from time $t_{k-1}$ is $\theta_{k-1}^{MAP}$, the approximating models need to be accurate for a wide range of possible future values of the uncertain parameter around its previous MAP estimate. For this reason, interpolation points may be selected such that $$\theta_{k,i}^{m=1} = \theta_{k,i}^{MAP} \sigma_{\theta_{k,i}}, \theta_{k,i}^{m=2} = \theta_{k,i-1}^{MAP},$$
$$\theta_{k,i}^{m=3} = \theta_{k,i}^{m=2} = \theta_{k,i-1}^{MAP} + \sigma_{\theta_{k,i}} \quad (29)$$

where $\sigma_{\theta_{k,i}}$ is the expected a priori deviation of the uncertain parameter. The approximation approach described above can be applied to the states x and model observations y, and the reduced order approximations are denoted by $\hat{G}_x$ and $\hat{G}_y$ respectively.

As a demonstrating example, the slip velocity u_slip and the rate of gas kick m_dot_gaskick are considered as uncertain parameters, and the model approximations are generated around a single interpolation point. The relative output error from uncertain parameters to model outputs, can be defined as, $$E_2 \frac{\sum_{k=0}^{N} \|G\hat{G}\|_2^2}{\sum_{k=0}^{N} \|G\|_2^2} \quad (30)$$

To perform an analysis of the approximations, a multi-phase Simulink model was configured to represent a wellbore (described later in more detail) which is governed by nonlinear dynamics due to its short length. The approximations are accurate in the relative error norm around the interpolation points, and as expected, the relative error of approximation degrades with distance from that interpolation point. Also, it can be seen that the behaviour of the model is non-linear for varying uncertain parameters and model inputs. Generally, the model is sensitive to changes of model inputs, to changes of the uncertain parameter m_dot_gaskick but not to changes of slip velocity u_slip_in.

A SCMH approach for sampling from the posterior distribution of the uncertain parameters, and a model approximation approach specifically tailored for SCMH have been described. An example Bayesian inference algorithm can be defined according to an embodiment, based on this sampling method and model approximation approach. It will be appreciated that similar principles can be applied using other sampling approaches, and with other model approximation approaches. The specific examples given here are merely illustrative.

Example Bayesian Inference Algorithm

1) Define the noise variables and the shrinkage prior of the uncertain parameters $$e_k^\theta \sim p_e^\theta(e_k^\theta), e_k^y \sim p_{e^y}(e_k^y), \theta \sim p_\theta(\theta)$$

2) At time $t_k$ given inputs $u_k$, MAP estimates of current state $x_k^{MAP}$, uncertain parameters $\theta_k^{MAP}$, and expected a priori deviation of the uncertain parameters $\sigma_{\theta_k}$, build approximate forward models (e.g. as described above), $$\hat{G}_x(\theta_{k+1}) \approx G_x(x_k, \theta_{k+1}, u_k)$$

$$\hat{G}_y(\theta_{k+1}) \approx G_y(G_x(x_k, \theta_{k+1}, u_k))$$

3) At time $t_{k+1}$ given sensor measurements $y_{k+1}$ sample $\{\theta_{k+1}^{(j)}\}_{j=1}^{N}$ directly from the posterior (e.g. by single component Metropolis Hastings):

Starting from the MAP parameter $\theta_{k+1}^{(0)} = \theta_k^{MAP}$,
for j = 1 : Nsamples
  $\tilde{\theta}_{k+1}^{(j)} = \theta_{k+1}^{(j-1)}, \theta_{k+1}^{(j)} = \theta_{k+1}^{(j-1)}$
  for i = 1 : length($\theta_k$)
    $\tilde{\theta}_{k+1,i}^{(j)} = \theta_{k+1,i}^{(j-1)} + e_{k+1,i}^{\theta(j)}$ (random walk)
    $\pi_{new}(\tilde{\theta}_{k+1}) = p_{e^y}(y_{k+1} - \hat{G}_y(\tilde{\theta}_{k+1}^{(j)})) p_\theta(\tilde{\theta}_{k+1}^{(j)}) \delta(\underline{\theta} \leq \tilde{\theta}_{k+1}^{(j)} \leq \overline{\theta})$
    $\pi_{old}(\theta_{k+1}) = p_{e^y}(y_{k+1} - \hat{G}_y(\theta_{k+1}^{(j)})) p_\theta(\theta_{k+1}^{(j)}) \delta(\underline{\theta} \leq \theta_{k+1}^{(j)} \leq \overline{\theta})$ $\alpha = \min\left(1, \frac{\pi_{new}(\tilde{\theta}_{k+1})}{\pi_{old}(\theta_{k+1})}\right)$, (Acceptance probability)

Upon acceptance (i.e. if $\alpha > \mathcal{U}[0,1]$):
      $\theta_{k+1,i}^{(j)} = \tilde{\theta}_{k+1,i}^{(j)}$ else
      $\theta_{k+1,i}^{(j)} = \theta_{k+1,i}^{(j)}$
  end
end 4) Optionally, compute the statistical properties of the states based on the ensemble of approximate states (although not used to determine the update of the state parameter, the distribution of states may be used for confidence intervals, etc.), $$\{\hat{x}_{k+1}^{(j)}\}_{j=1}^{N}; \hat{x}_{k+1}^{(j)} = \hat{G}_x(\theta_{k+1}^{(j)})$$

5) Compute MAP estimate of $\theta_{k+1}{}^{MAP}$ from the ensemble $\{\theta_{k+1}{}^{(j)}\}_{j=1}^{N}$ and simulate the MAP state with the full forward model (thereby preventing any perturbation into states that are not consistent with physics, as discussed above)

$$x_{k+1}{}^{MAP} = G_x(x_k{}^{MAP}, \theta_{k+1}{}^{MAP}, u_k)$$

and go to 2).

It can be seen that the algorithm above determines system parameters that are consistent with the present (uncertain) measurement results. The present measurement and present state are a function of the previous states, current parameters and previous inputs.

In the above algorithm, the approximate models are updated over time. It will be appreciated that this is not essential, and a model order reduction or simplification may instead be performed offline (e.g. before any measurements are received), for example based on an expected state/parameter space. Furthermore, instead of updating the approximate model at each time interval, the method may include updating the approximate model only when system parameters or states have changed by more than a threshold amount. The threshold amount may be determined based on the expected approximate model error, so that the approximate model is updated when it is expected (or determined) that it has become inaccurate. Alternatively, the threshold model may be updated periodically, every n time intervals (where n is 2, 3, 4, 5, 10 etc.), or at a different predetermined time interval.

In the example algorithm, the model approximation is based on the present MAP estimate of the model state, and an estimate (or estimates) of the model parameters. The model approximation may be performed about a range defined with reference to such a MAP approximation (for instance at plus or minus n expected (e.g. a priori) standard deviations from the MAP approximations of states and parameters, with n being 1, 2, 3, 4, 5, 10 or some other number).

Although the method disclosed above includes inputs u similar methods can be applied to systems that do not have model inputs, for example modelling of a magma chamber or volcano in order to predict eruption.

Figure 7:
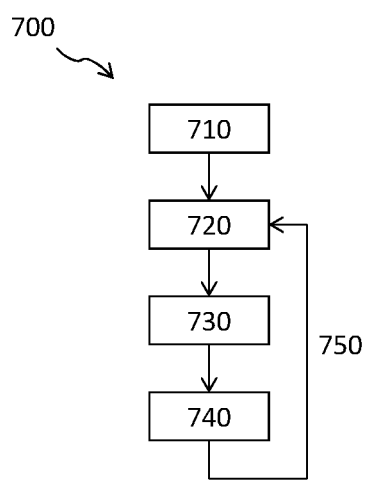
FIG. 7 is a flow diagram of a method according to an embodiment.

Referring to FIG. 7, an example method 700 is depicted. In the first block 710 an approximate model of the system is built. This may be by conventional model order reduction techniques (e.g., projection based methods, singular value decomposition, proper orthogonal decomposition, rational interpolation etc., where the underlying equations of the evolution model are available for example in state-space form), or by non-conventional approximation techniques (e.g. piecewise linear approximation, stochastic spectral methods, neural networks, using a look-up table of results, sampling etc.).

At block 720 a sample of system parameter values for a current time interval are generated from an approximate posterior probability distribution. The approximate posterior distribution represents the probability distribution of the system parameter, conditional on a system measurement for a current time interval and conditional on the approximate model representing the transition from the previous state to the present state (reflected in the present measurements), given a particular parameter value (or set of parameter values).

At block 730 an estimate of the system parameter value at the current time interval is determined from the distribution of the plurality of sampled system parameter values. For example, the distribution may be used to determine the MAP system parameter value (or an estimate may be determined based on another appropriate criteria).

At block 740, an estimate of a system state at the current time interval is determined by simulating the evolution of an estimate of the system state for the previous time interval to the current time interval, given the estimate of the system parameter generated at 730. The evolution of the system may be determined from a more complex (and/or more accurate) model than the approximate model.

As indicated at 750, the method comprises incrementing the time interval when a new system measurement is available, and repeating 720 to 740.

The method 700 may include displaying an indication of the estimated system state at each time interval on a display device.

The method 700 may include controlling the system via a system input, wherein the system input is varied in response to the estimated system state and/or system parameter.

The system input may be varied according to a control law that is responsive to the estimated system state and/or system parameter.

The building of the approximate model at a) may be derived from a complex model of the system and an estimate of: a system state, a system parameter and a system input.

The determination of the estimate of the system state for the next time interval at d) may comprise simulating the evolution of the estimate of the system state from the previous time interval to the current time interval, given the estimate of the system parameter and the system input for the previous time interval.

The building of the approximate model may be derived from a complex model of the system and an estimate of: a system state and a system parameter. Simulating the evolution of the estimate of the system state in may comprise using the complex model of the system with the estimated system parameter for the current time interval.

A maximum a posteriori estimation may be determined at c) which may comprise determining for the system parameter, derived from the distribution of the plurality of sampled system parameter values.

The approximate model may be a non-linear approximate model.

The plurality of sampled system parameter values for the current time interval may be generated by a random walk process.

The sampling of the plurality of sampled system parameter values for the current time interval may be in accordance with the Single-Component Metropolis Hastings algorithm.

A plurality of approximate system states may be determined for the current time interval, the approximate system states being derived from the approximate system model and the sampled system parameter values.

The approximate model may be built by trajectory piecewise-linear approximation.

The building of the approximate model at may be derived from a complex model of the system and an estimate of: a system state and/or a system parameter. Using the approximate model may comprise updating the approximate model by deriving an approximation of the complex model using an estimate of a system state and an estimate of the system parameter.

The system may comprise a wellbore.

The method may include automatically averting or mitigating an undesirable drilling event during a drilling process. The method may comprise:
 detecting an undesirable drilling event or predicting an incipient undesirable drilling event from the estimated system parameter and/or the estimated system state;
 determining an action that averts or mitigate the undesirable drilling event; and
 commanding performance of the action.

The undesirable drilling event may include at least one of the following: a kick, a gas kick, a plugged drill bit nozzle, formation fracture, lost circulation, drill bit wear, pump motor stall and a pressure surge.

The method 700 may further comprise controlling the system via a system input, wherein: the system input is varied in response to the system state and/or system parameter.

Example Numerical Results

To demonstrate the approximate model inversion approach proposed, a process was simulated representing an experimental wellbore in Botteford, UK. The wellbore is about 300 meters long and pressure measurements are provided via 8 pressure transducers distributed along a wired drill pipe. Gas can be injected through a perforation line at the bottom of the well. Note that such a wellbore has very nonlinear characteristics compared to a longer well. This has an effect on model simulation time: the computational cost of a full multiphase-flow simulation model allows a very small number (<7) of simulations of the forward model in real-time (e.g. between successive time intervals) ignoring any other processing computational costs. This is prohibitive for any real-time statistical model inversion scheme (7 not being a sufficient sample size).

In the example below, the prior in gas slip is assumed to be a Gaussian distribution with mean 0.5 m/sec and standard deviation of 0.1 m/sec. The gas kick is assumed to be entering the annulus from the bottom of the hole with a zero mean Gaussian prior and variance 2 kg/sec.

To monitor the process fully the states are estimated at each time interval. As summarized in Table 1 (above) the states are the distribution of gas mass along the annulus, the distribution of fluid mass along the annulus, and the distribution of the velocity of their mixture along the annulus. These states are long vectors and the concatenation of discretization points along the states results in a vector of dimensionality of 151. On the other hand, the observable variables are a handful of pressure measurements. To demonstrate the proposed technique, without loss of generality, pressure measurements were collected from model simulations considering a set of time varying inputs and parameters. The goal of model inversion is to estimate the uncertain parameters and infer a state of the process that is consistent with real-time (or near-real time) pressure measurements. In the following, results are demonstrated through two scenarios.

In the first scenario a simpler case is simulated where the initial state of the process is known; that is, there is no gas in the annulus. This first simulation is shown in FIGS. 8 to 11.

Figure 8:
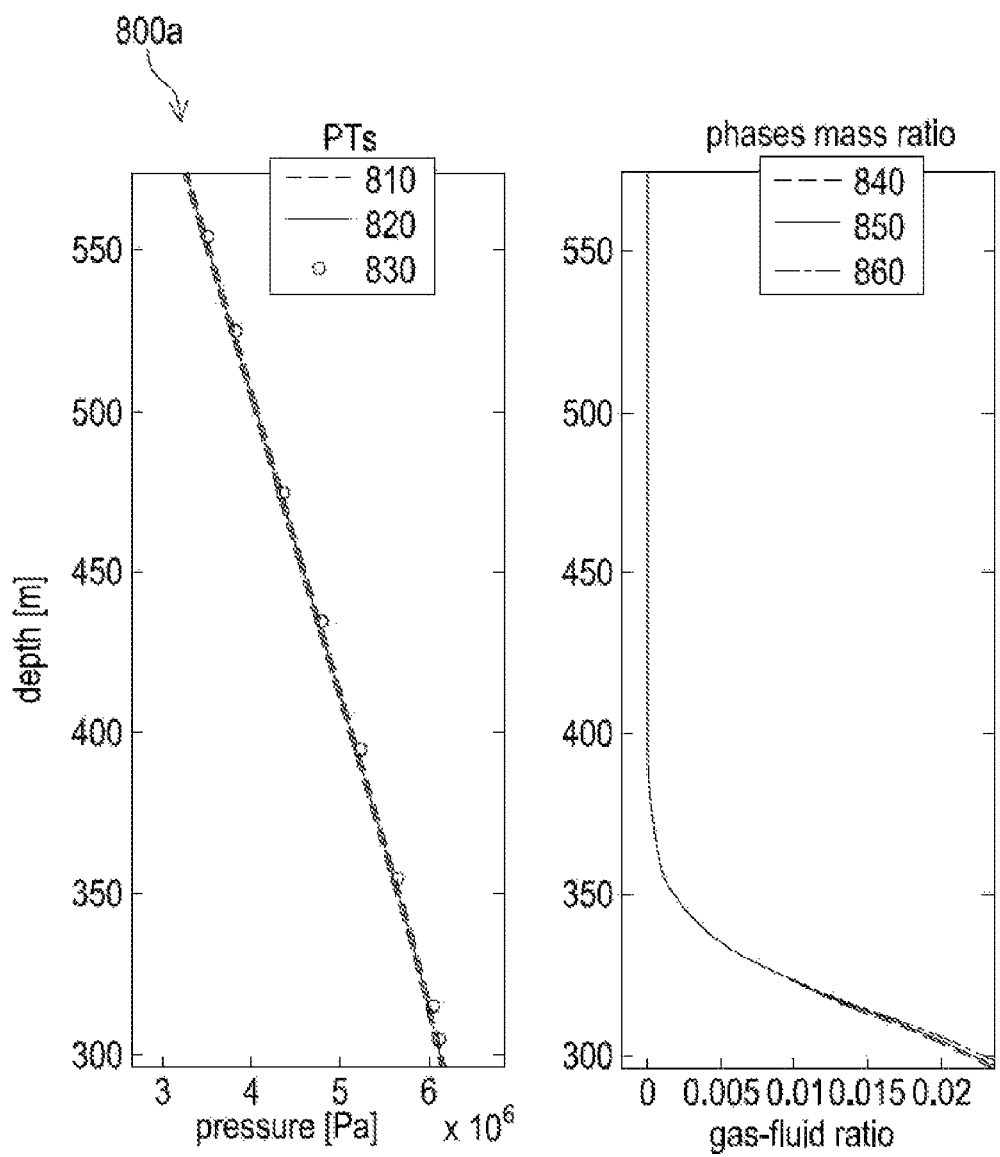
FIGS. 8-10 are graphs comparing state estimates produced according to an embodiment for pressure (left) and gas-fluid mass ratio (right) with actual (simulated) state data, for t=10 seconds (FIG. 8); t=20 seconds (FIG. 9); and t=800 seconds (FIG. 10)
Figure 9:
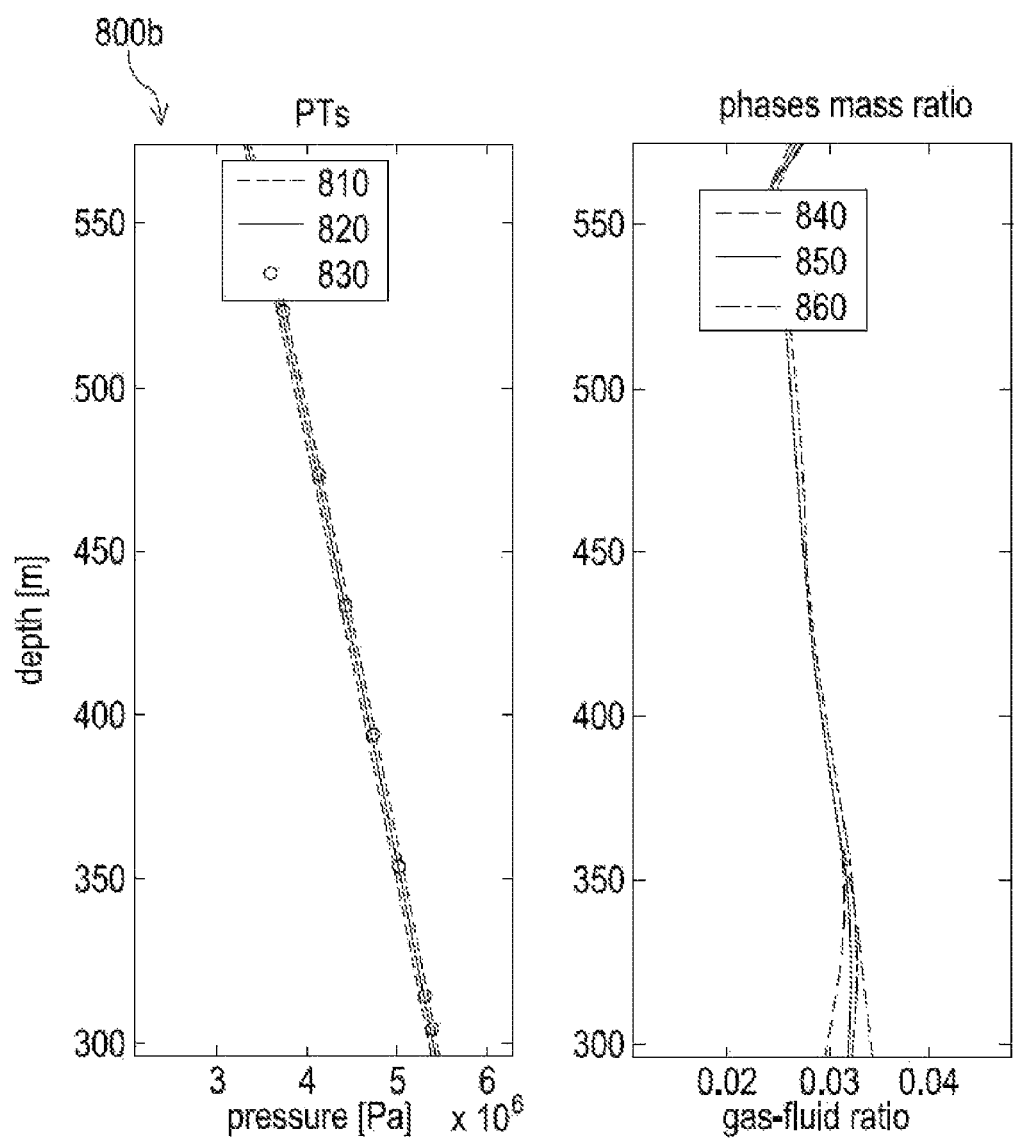
Figure 10:
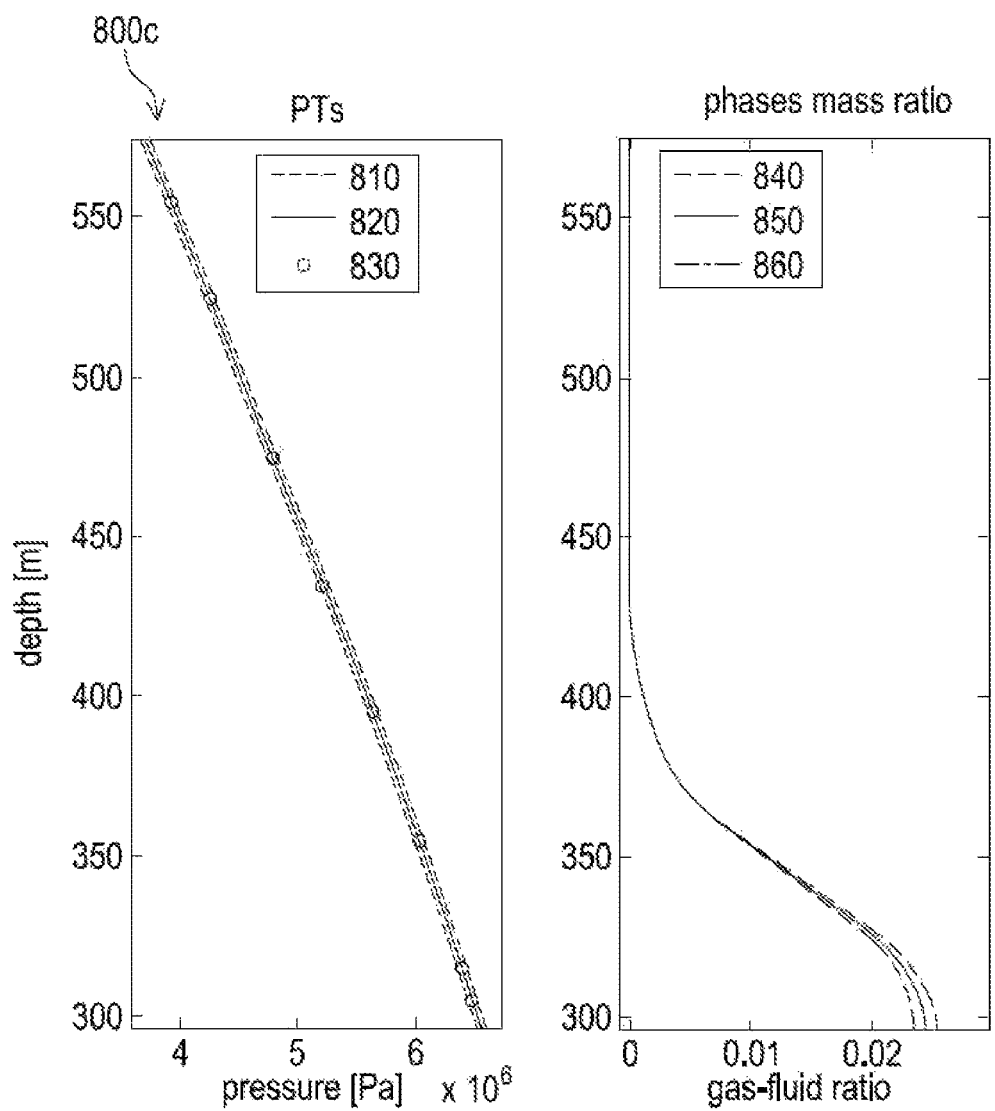
Figure 11:
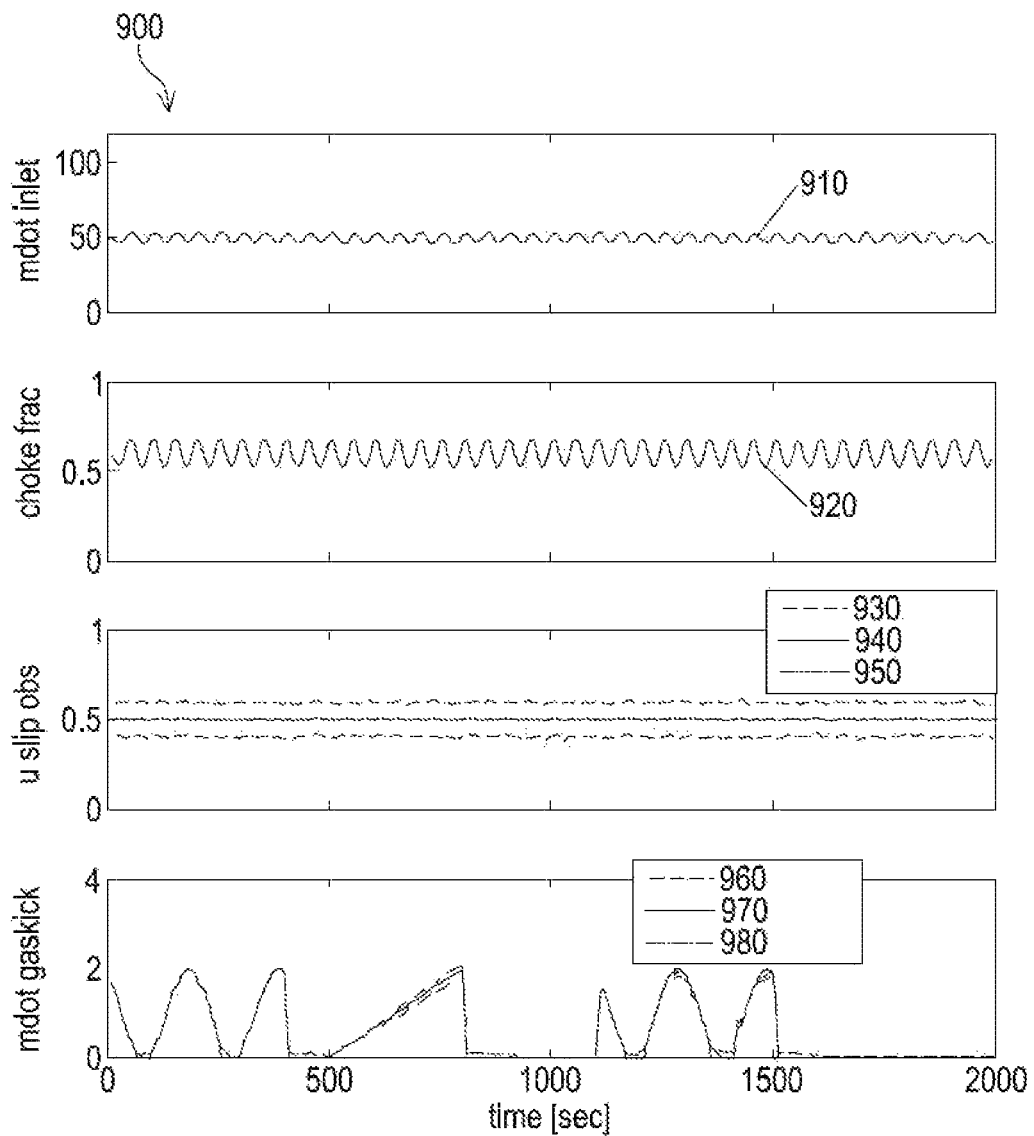
FIG. 11 shows graphs of input parameters pump flow and choke fraction; and graphs comparing parameter estimates produced according to an embodiment for slip velocity and gas kick rate with actual (simulated) data.

FIGS. 8 to 10 show the evolution of the pressure profile and the phase mass ratio profile over time (defined as the ratio of gas mass over the mixture mass at a wellbore depth). FIG. 8 is at t=10 s, FIG. 9 is at t=20 s and FIG. 10 is at t=800 s. In each of FIGS. 8 to 10, the left hand graph shows the pressure profile and the right hand graph shows the phase mass ratio. In the pressure profile, the measurements from the sensors 830 are plotted against estimates of the system state 820, with 2σ curves 830 to either side. In the phase mass ratio graph, the true (simulated) phase mass ratio 860 is plotted with the estimated phase mass ratio 850 and the corresponding 2σ curves 840. In FIG. 11 the time history 900 of the model inputs and of the estimated (uncertain) parameters are shown for the first scenario. The plots show actual (simulated) values for mass flow at the inlet 910, choke fraction 920, and estimated parameter values for gas slip velocity 940 and gas kick rate 970. The estimated parameter curves 940, 970 are respectively shown with 2σ bounds 930, 960 to either side, and are plotted with the actual (simulated) parameter values 950, 980 respectively.

In this first scenario, the inputs 910, 920 to the system (choke fraction and pump flow) are kept constant. The inputs 910, 920 are corrupted with periodic noise and pump flow is also corrupted with low SNR (signal to noise ratio) additive white noise. In FIG. 11 it can be seen that the uncertain parameter estimates 940, 970, track the true underlying values 950, 980. The slip velocity has wide variability (indicated by 930) around its mean value 940. As is apparent from an analysis of the approximate model, the process state is not strongly affected by the slip velocity. Thus, the variability of the slip velocity corresponds to the prior standard deviation. On the other hand, the gas kick rate estimation 970 has tight bounds 960 around the true value 980, as the model behaviour is strongly dependent on the gas kick rate.

The estimations 820, 850 of the pressure and phase mass ratios shown in FIGS. 8 to 10 accurately represent the true state of the system. As expected, the uncertainty (indicated by 840) of gas-fluid mass ratio 850 is higher near the bottom of the wellbore, which is the entry location of the gas.

A second scenario is depicted in FIGS. 12 to 15, in which like elements are given the same numbering used with reference to FIGS. 8 to 11. This second scenario is a harder scenario in which to determine accurate state and parameter estimations, in which the ability of the proposed approach to infer the state of the process starting from unknown initial conditions is investigated. In the second scenario the initial distribution of gas along the annulus and the pressure distribution along the annulus is not known, but these states are instead estimated, a priori.

Figure 15:
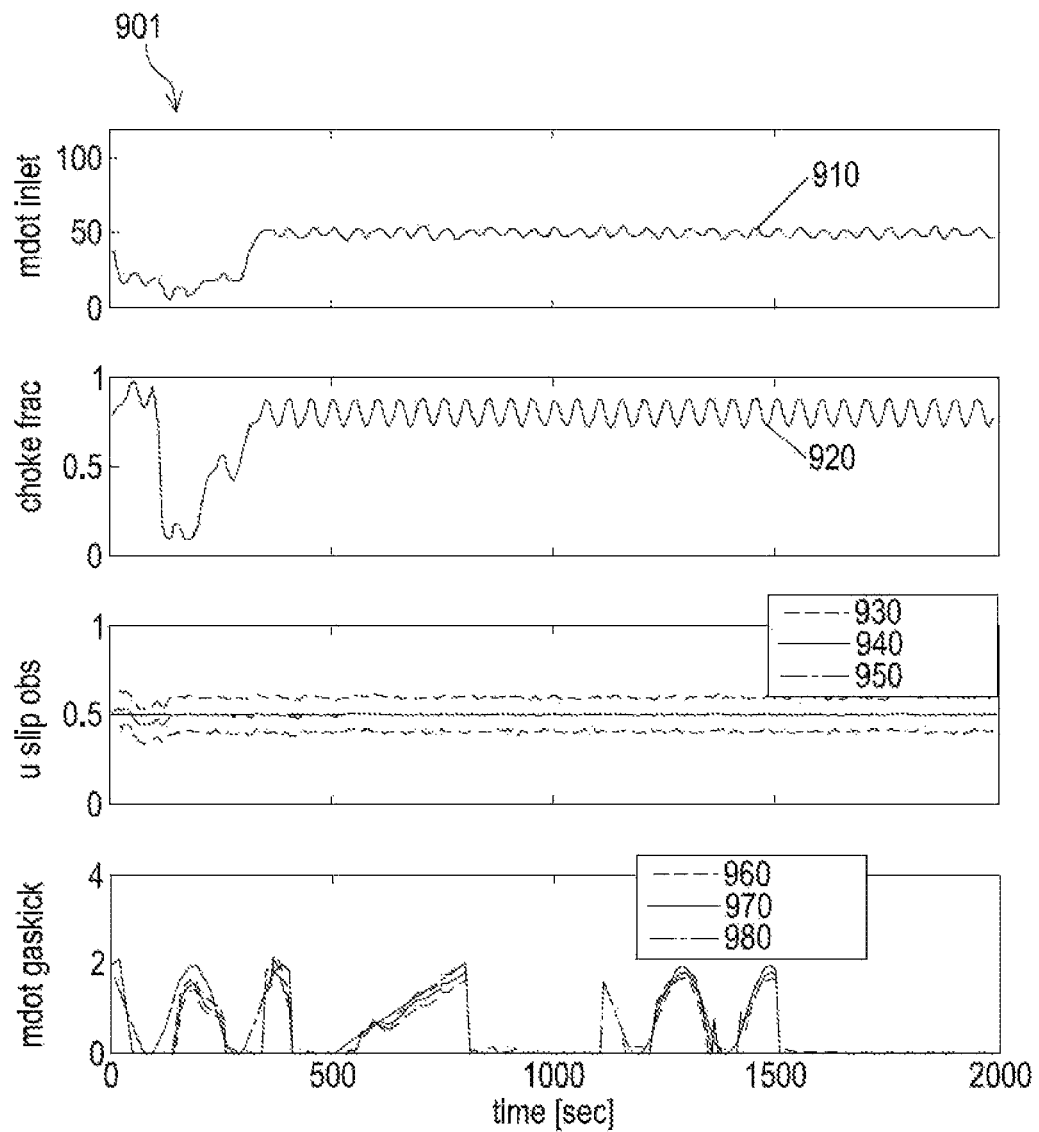
FIG. 15 shows graphs of input parameters pump flow and choke fraction; and graphs comparing parameter estimates produced according to an embodiment from an unknown initial state for slip velocity and gas kick rate with actual (simulated) data.

To increase the complexity of the scenario, the inputs 910, 920 are not considered constant initially, but are varied as shown in FIG. 15. Similarly to the previous scenario the inputs 910, 920 are corrupted with periodic noise, and pump flow 910 is also corrupted with additive white noise.

Figure 12:
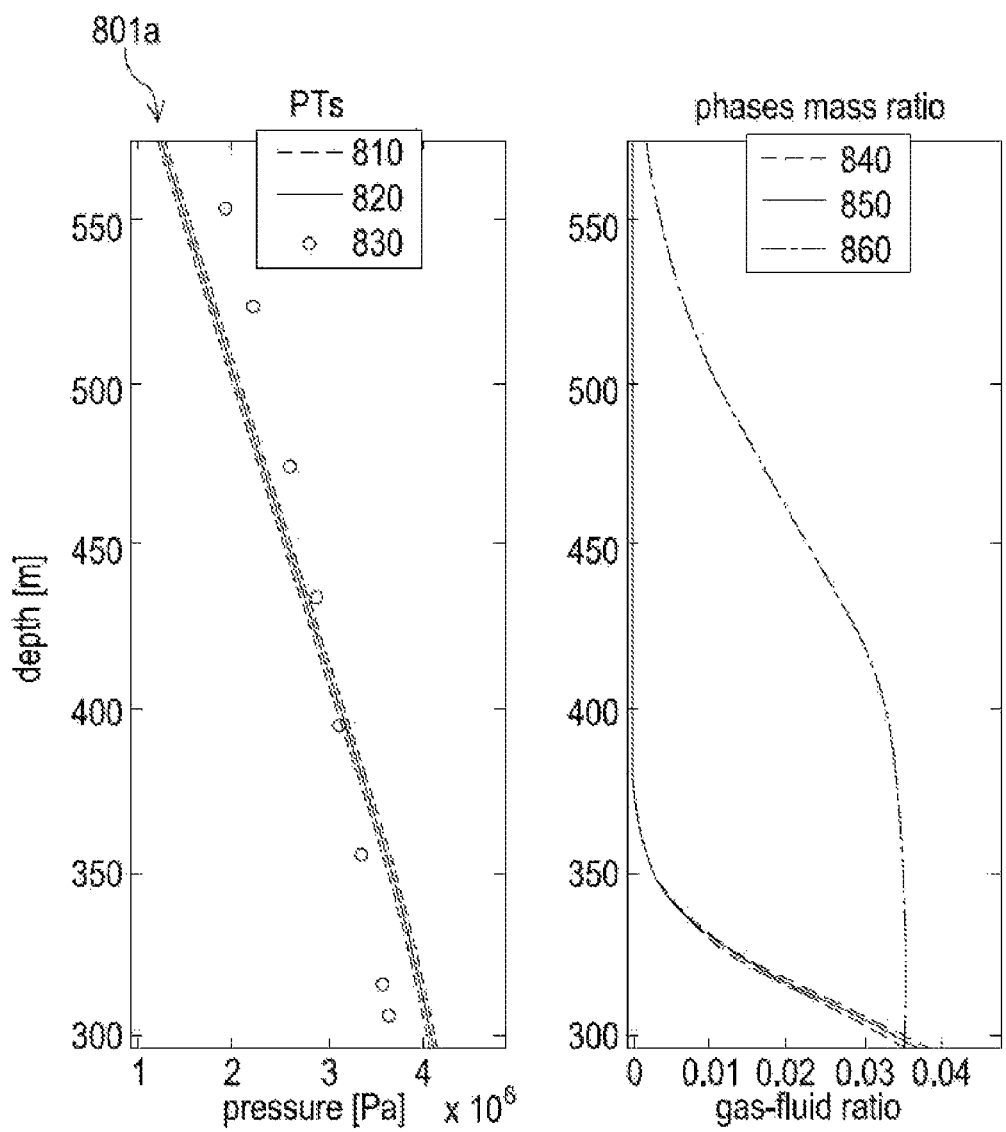
FIGS. 12-14 are graphs comparing example state estimates produced according to an embodiment from an unknown initial state for pressure (left) and gas-fluid mass ratio (right) with actual (simulated) state data, for t=1° seconds (FIG. 8); t=20 seconds (FIG. 9); and t=800 seconds (FIG. 10)
Figure 13:
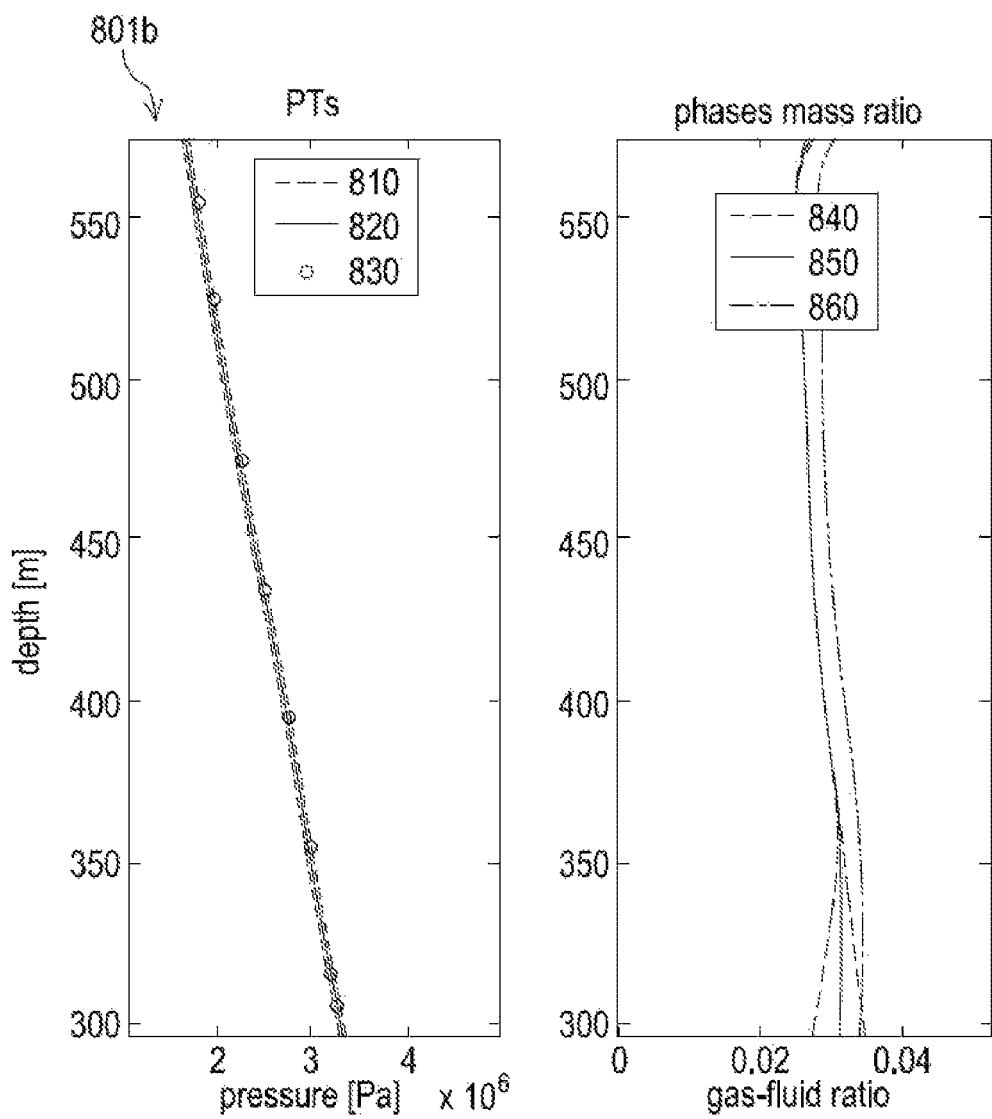
Figure 14:
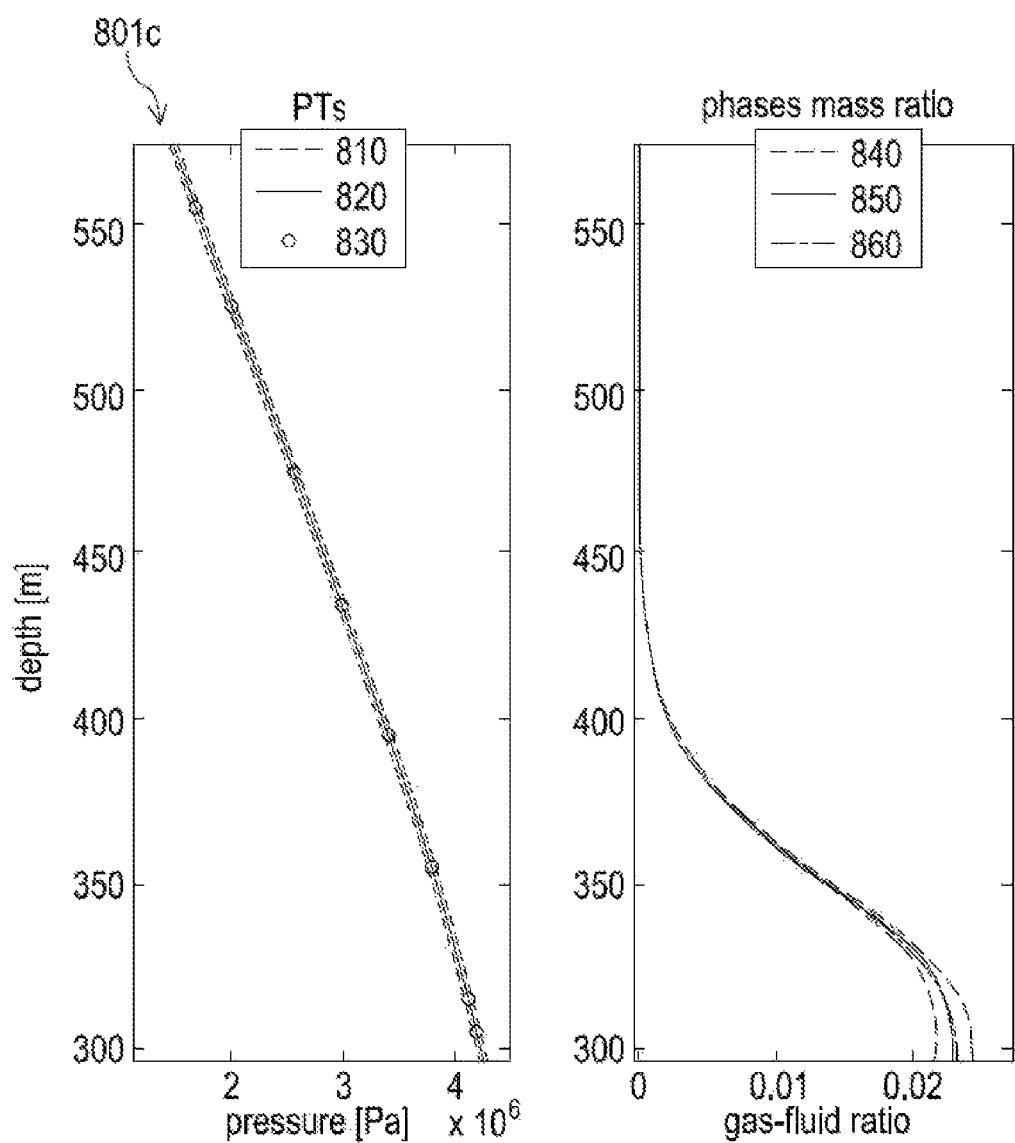

As seen in FIG. 12 the method starts without any knowledge of the state of the system. The estimated state of the pressure distribution 820 is not consistent with the measurements 830, and the state of the estimated phase mass ratio 850 is not consistent with the actual phase mass ratio profile 860. Over time, the approximate inversion approach disclosed herein learns the underlying parameter and states, and the estimations 820, 850, 940, 970 converge to their respective true underlying values 830, 860, 950, 980. In FIG. 13, after an initial learning period (of perhaps 800 seconds), the gas kick rate estimation 970 begins to track the real underlying value 980 accurately.

The approach disclosed herein allows computational acceleration of an order of magnitude compared to sampling and importance resampling. The computational acceleration enables real time monitoring for the simulated wellbore presented in the results above. It should be noted that the experimental wellbore simulated above represents a more non-linear process than a typical real well due to its short length; this slows down the performance of the model. Also alternative implementation of the same full forward model using a more efficient programming language, e.g., Python or C++, can provide more efficient full forward model simulations. Real time monitoring of a real well is therefore enabled by the present method. In the context of the present disclosure (which is not limited in application to a well) real time may mean that the system state is estimated in less than: 0.1 s, 0.2 s, 0.5 s, 1 s, 2 s, 5 s, 10 s, 30 s, or 1 minute. The time between successive time intervals may be less than or equal to: 0.1 s, 0.2 s, 0.5 s, 1 s, 2 s, 5 s, 10 s, 30 s, or 1 minute and an estimate of the system state may be produced before the start of the next time interval.

In some systems (e.g. highly non-linear systems) it may be desirable for the proposed method to start from a feasible (physical) state solution. Computing a feasible solution of a nonlinear system can require some effort. In the embodiment being described, the problem of computing an initial feasible solution is formulated as an optimization problem and this is provided as a packaged function together with the model. Such optimisation problems are well known to the skilled person and are relatively routine to solve.

The confidence intervals in FIG. 9 to FIG. 15 do not represent the confidence on the state given the data y, since predictions are made of future states only given the previous MAP state. Once convergence occurs, then these confidence intervals are an approximation of the true intervals.

Figure 16:
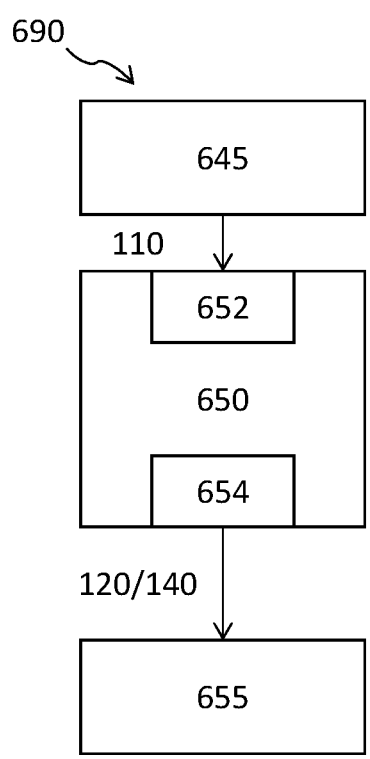
FIG. 16 is a schematic diagram of a system including a processor, configured to perform a method in accordance with an embodiment.

A processor may be configured to perform the method. An example system 690 comprising such a processor 650 is shown in FIG. 16. The processor 650 comprises an input element (e.g. interface) for receiving measurements 110 from sensors 645. The processor 650 is configured by a program (or set of instructions) to perform a method according to an embodiment, and to thereby produce an output comprising estimates of one or more system states 120 and/or one or more system parameters 140. The processor 650 outputs these estimates via an output element 654, for example to an indicator 655. The indicator 655 may comprise a display screen, or may be any other suitable indicator, such as a warning light, buzzer, alarm system, messaging notification system (e.g. email/SMS etc.).

The present method may be applied to measurement while drilling systems, and used to detect undesirable drilling events, such as a kick (i.e. reservoir fluids entering the wellbore during drilling), a gas kick (gas from the reservoir entering the wellbore, a plugged drill bit nozzle, fracture formation (e.g. as a result of excessive overpressure of the wellbore), lost circulation (e.g. arising from a fractured formation), pump motor stall and a pressure surge.

Figure 17:
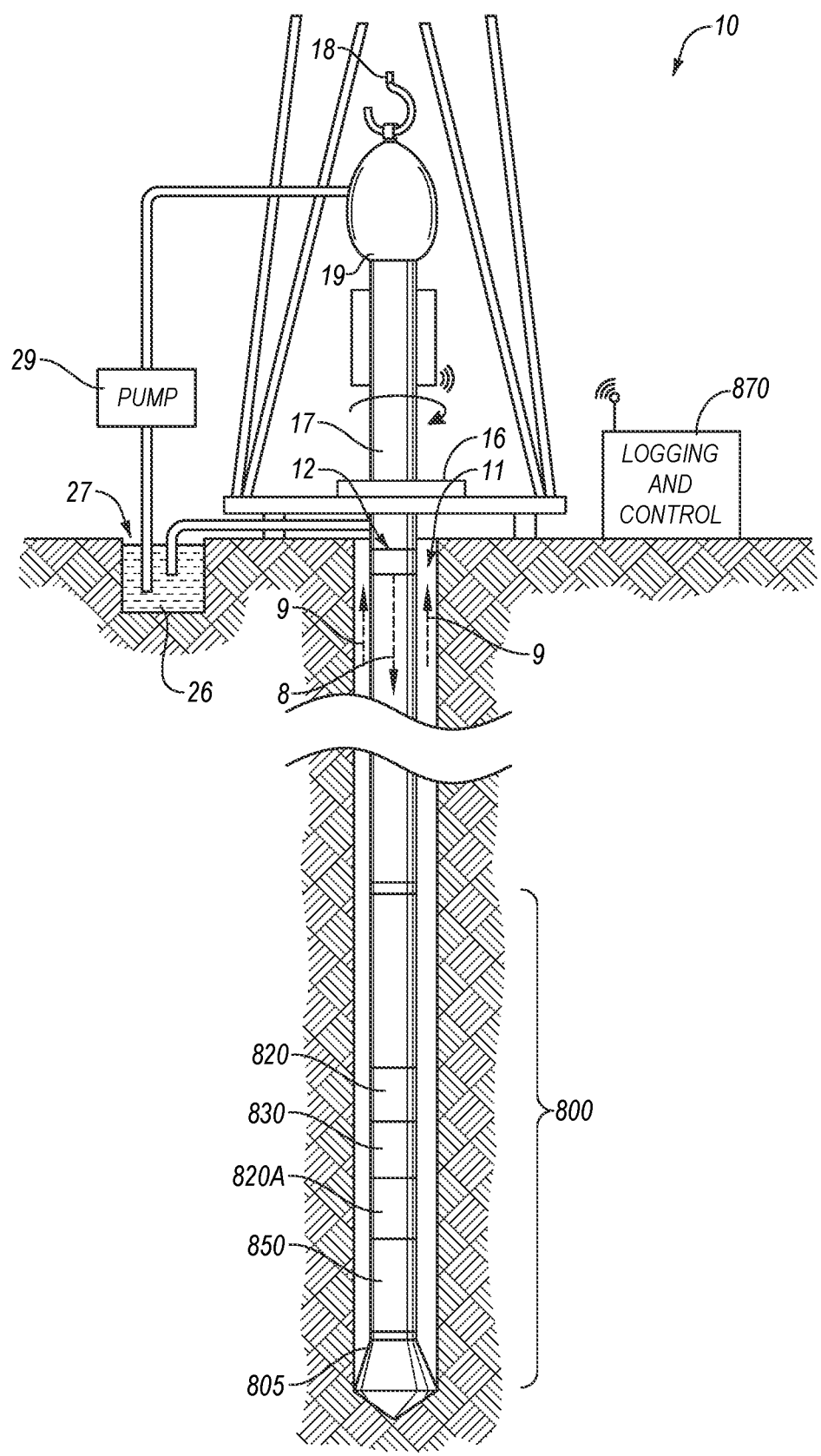
FIG. 17 is a schematic diagram of a system comprising a wellbore and a processor configured in accordance with an embodiment.

FIG. 17 illustrates a wellsite system in which the present embodiments of the present disclosure can be employed. The wellsite can be onshore or offshore. In this exemplary system, a borehole 11 is formed in subsurface formations by rotary drilling in a manner that is well known. Embodiments of the disclosure can also use directional drilling.

A drill string 12 is suspended within the borehole 11 (e.g. wellbore) and has a bottom hole assembly 800 which includes a drill bit 805 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 805, and then circulates upwardly through the annulus region between the outside of the drill string and the wall of the borehole, as indicated by the directional arrows 9. In this well-known manner, the drilling fluid lubricates the drill bit 805 and carries formation cuttings up to the surface as it is returned to the pit 27 for recirculation. Drilling fluids is also used to control the pressure in the wellbore. If the pressure in the annulus is less than that in the formation, the wellbore could collapse or formation fluids may enter the wellbore causing a kick. If the pressure in the annulus of the wellbore is higher than that in the formation, this could cause a fracture in the formation. The pressure in the wellbore may be controlled by adjusting the opening of a choke at the surface and/or changing the composition and properties of the drilling fluid.

The bottom hole assembly 800 of the illustrated embodiment a logging-while-drilling (LWD) module 820, a measuring-while-drilling (MWD) module 830, a roto-steerable system and motor, and drill bit 805.

The LWD module 820 may be housed in a special type of drill collar, as is known in the art, and can contain one or a plurality of known types of logging tools. It will also be understood that more than one LWD and/or MWD module can be employed, e.g. as represented at 820A. The LWD module includes capabilities for measuring, processing, and storing information, as well as for communicating with the surface equipment.

In some embodiments, the logging and control unit 870 is provided, that receives signals comprising measurement data from at least one of the LWD modules 820 and MWD modules 830. The logging and control unit 870 may control the operation of at least one element of the pump 29 and/or the derrick assembly 10 (e.g. the rotary table). The logging and control unit 870 may be configured to perform a method according to an embodiment, in which a state or parameter of the wellbore is estimated based on a time series of measurement data from the LWD and/or MWD modules.

Figure 18:
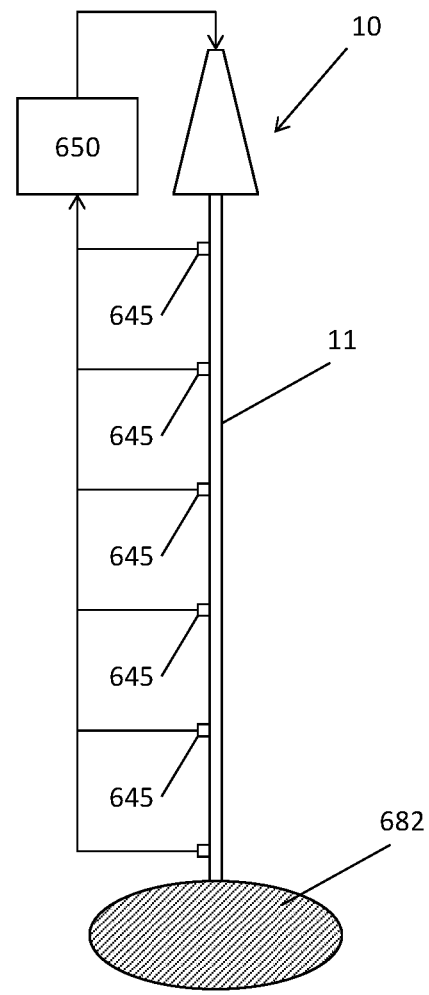
FIG. 18 schematically shows a drilling or production system.

Referring to FIG. 18, a wellsite system comprising a drilling or production system is schematically illustrated, comprising a wellbore 11 and a platform and derrick assembly 10, which can control the state of the wellbore 11 using various inputs (e.g. choke fraction). A plurality of sensors 645 are provided in the wellbore, which transmit measurement data 110 to a processor 650. The sensors 645 may be part of LWD modules or MWD modules, as shown in FIG. 17. The processor 650 may further receive information on the control inputs exerted by the platform and derrick assembly 10 over the wellbore 11. The wellbore 11 may be in communication with a reservoir 682 (e.g. a hydrocarbon reservoir). The control parameters may be provided by the processor 650, or a further processor (not shown) may determine what control parameters are appropriate, based on a control rule responsive to at least one of the system states and/or parameters estimated by the processor.

Methods according to embodiments may be particularly appropriate for use in control of a wellbore, because they are suitable for generating accurate estimates of non-linear systems in real time.

Although the preceding description has been described herein with reference to particular means, materials and embodiments, it is not intended to be limited to the particulars disclosed herein; rather, it extends to all functionally equivalent structures, methods and uses, such as are within the scope of the appended claims.

The invention claimed is:

1. A method of controlling a wellbore, comprising determining at least one of a pressure of the wellbore or a gas-fluid mass ratio of a gas mass to overall fluid mass of the wellbore from a time series of wellbore measurements that include one or more of pressure measurements or flow rate measurements, which includes using a processor to:
   a) build an approximate model of the wellbore;
   b) sample a plurality of wellbore parameter values for a current time interval from an approximate posterior probability distribution that represents a probability distribution of the wellbore parameter conditional on the wellbore measurement for the current time interval and the approximate model, with the wellbore parameter including at least one of gas slip velocity or gas kick rate;
   c) determine an estimate of the wellbore parameter at the current time interval from the distribution of the plurality of sampled wellbore parameter values;
   d) determine an estimate of the pressure of the wellbore or the gas-fluid mass ratio of the wellbore at the current time interval by simulating the evolution of an estimate of the pressure of the wellbore or the gas-fluid mass ratio of the wellbore for a previous time interval to the current time interval, given the estimate of the wellbore parameter;
   e) repeat b) to d) for a next time interval; and
   controlling the wellbore using a wellbore input that is varied in response to the estimated pressure of the wellbore or the gas-fluid mass ratio of the wellbore or the wellbore parameter.

2. The method of claim 1, further comprising:
   displaying an indication of the estimated pressure of the wellbore or the gas-fluid mass ratio of the wellbore at each of the previous, current, and next time intervals on a display device.

3. The method of claim 1, wherein controlling the wellbore using the wellbore input includes varying the wellbore input according to a control law that is responsive to the estimated pressure of the wellbore or the gas-fluid mass ratio of the wellbore or the estimated wellbore parameter.

4. The method of claim 1, wherein:
   the building of the approximate model at a) is derived from a complex model of the wellbore and an estimate of: pressure of the wellbore or the gas-fluid mass ratio of the wellbore, a wellbore parameter, and a wellbore input; and
   the determination of the estimate of the pressure of the wellbore or the gas-fluid mass ratio of the wellbore for the next time interval at d) comprises simulating the evolution of the pressure of the wellbore or the gas-fluid mass ratio of the wellbore from the previous time interval to the current time interval, given the estimate of the wellbore parameter and the wellbore input.

5. The method of claim 1, wherein:
   the building of the approximate model at a) is derived from a complex model of the wellbore and an estimate of: pressure of the wellbore or the gas-fluid mass ratio of the wellbore and a wellbore parameter; and
   the simulating of the evolution of the estimate of the pressure of the wellbore or the gas-fluid mass ratio of the wellbore in d) comprises using the complex model of the wellbore with the estimated wellbore parameter for the current time interval.

6. The method of claim 1, wherein c) comprises determining a maximum a posteriori estimation for the wellbore parameter, derived from the distribution of the plurality of sampled wellbore parameter values.

7. The method of claim 1, wherein the approximate model is a non-linear approximate model.

8. The method of claim 1, wherein the plurality of sampled wellbore parameter values for the current time interval is generated by a random walk process.

9. The method of claim 1, wherein the sampling of the plurality of sampled wellbore parameter values for the current time interval is in accordance with the Single-Component Metropolis Hastings algorithm.

10. The method of claim 1, wherein c) further comprises determining a plurality of approximate pressures of the wellbore or the gas-fluid mass ratios of the wellbore for the current time interval, the approximate pressures of the wellbore or the gas-fluid mass ratios of the wellbore being derived from the approximate wellbore model and the sampled wellbore parameter values.

11. The method of claim 1, wherein a) comprises building the approximate model by trajectory piecewise-linear approximation.

12. The method of claim 1, wherein:
   the building of the approximate model at a) is derived from a complex model of the wellbore and an estimate of: pressure of the wellbore or the gas-fluid mass ratio of the wellbore and a wellbore parameter; and
   using the approximate model in b) comprises updating the approximate model by deriving an approximation of the complex model using an estimate of pressure of the wellbore or the gas-fluid mass ratio of the wellbore and an estimate of the wellbore parameter.

13. The method of claim 1, wherein the method includes automatically averting or mitigating an undesirable drilling event during a drilling process, the method comprising:
   detecting an undesirable drilling event or predicting an incipient undesirable drilling event from the estimated wellbore parameter and/or the estimated pressure of the wellbore or the gas-fluid mass ratio of the wellbore;
   determining an action that averts or mitigates the undesirable drilling event; and
   commanding performance of the action.

14. The method of claim 13, wherein the undesirable drilling event includes at least one of the following: a kick, a gas kick, a plugged drill bit nozzle, formation fracture, lost circulation, drill bit wear, pump motor stall, or a pressure surge.

15. The method of claim 13, wherein controlling the wellbore using the wellbore input that is varied in response to the estimated pressure of the wellbore or the gas-fluid mass ratio of the wellbore or the wellbore parameter incudes feeding the estimated pressure of the wellbore or the gas-fluid mass ratio of the wellbore or the wellbore parameter to a control unit that controls a pressure profile of the wellbore by adjusting a surface choke.

16. An apparatus for controlling a pressure profile of a wellbore, comprising:

a processor that determines at least one of a pressure of the wellbore or a gas-fluid mass ratio of a gas mass to overall fluid mass of the wellbore from a time series of a measurement of a wellbore that includes one or more of pressure measurements or flow rate measurements, the processor including:
  an input element for receiving the time series of the measurement of the wellbore; and
  an output element for providing an estimate of a parameter of the wellbore, or an estimate of the at least one of the pressure of the wellbore or the gas-fluid mass ratio of the wellbore, for displaying on a display device;
wherein the processor is configured to provide, via the output element, an estimated wellbore parameter or pressure of the wellbore or the gas-fluid mass ratio of the wellbore by:
  a) building an approximate model of the wellbore for a current time interval;
  b) using the approximate model and, conditional on the wellbore measurement for the current time interval, sampling a plurality of wellbore parameter values that include at least one of gas slip velocity or gas kick rate for the current time interval from an approximate posterior probability distribution that represents the probability distribution of the wellbore parameter conditional on the wellbore measurement for the current time interval and based on the approximate model;
  c) determining an estimate of the wellbore parameter at a previous time interval from the distribution of the plurality of sampled wellbore parameter values;
  d) determining an estimate of the pressure of the wellbore or the gas-fluid mass ratio of the wellbore at the current time interval by simulating the evolution of the estimate of the pressure of the wellbore or the gas-fluid mass ratio of the wellbore for the previous time interval to the current time interval, given the estimate of the wellbore parameter for the current time interval;
  e) repeating a) to d) for a next time interval; and
a control unit in communication with the processor and which controls a pressure profile of the wellbore in response to receiving from the processor the estimate of the pressure of the wellbore or the gas-fluid mass ratio of the wellbore or the wellbore parameter.

17. The apparatus of claim 16, comprising a measurement while drilling system that includes the processor.

18. A machine readable medium, comprising a set of instructions for configuring a processor to perform the method of claim 1.

19. The method of claim 6, wherein e) includes sampling a plurality of wellbore parameter values for the next time interval, the plurality of wellbore parameter values including only states reachable from the maximum a posteriori estimation for the prior time interval.

20. The method of claim 1, wherein simulating the evolution of an estimate of the pressure of the wellbore or the gas-fluid mass ratio of the wellbore for a previous time interval to the current time interval includes using a symmetric proposal distribution in which it is equally probable to move from an estimate at the previous time interval to an estimate at the current time interval as to move from an estimate at the current time interval to the estimate at the previous time interval.

\* \* \* \* \*